United States Patent
Yang

(10) Patent No.: US 7,459,816 B2
(45) Date of Patent: *Dec. 2, 2008

(54) BIDIRECTIONAL COUPLING DEVICE WITH VARIABLE TRANSMISSION CHARACTERISTICS

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 90 days.

This patent is subject to a terminal disclaimer.

(21) Appl. No.: 10/915,451

(22) Filed: Aug. 11, 2004

(65) Prior Publication Data

US 2006/0032322 A1    Feb. 16, 2006

(51) Int. Cl.
*H02K 7/108* (2006.01)
(52) U.S. Cl. .......................... 310/78; 322/12

(58) Field of Classification Search .................. None
See application file for complete search history.

(56) References Cited

U.S. PATENT DOCUMENTS

| 5,549,524 | A | * | 8/1996 | Yang | 477/3 |
| 5,982,116 | A | * | 11/1999 | Yang | 318/77 |
| 6,297,575 | B1 | * | 10/2001 | Yang | 310/266 |
| 2007/0012539 | A1 | * | 1/2007 | Yang | 192/48.2 |

* cited by examiner

*Primary Examiner*—Rodney H Bonck
(74) *Attorney, Agent, or Firm*—Rabin & Berdo, P.C.

(57) ABSTRACT

A bidirectional flexible coupling device with variable transmission characteristics including one or multiple first input/out end and one or multiple second input/out end, indicating the transmission of specific or controllable flexibility or torque value when the first input/output end drives the second input/output end for transmission; and according to operation requirements, the transmission may be of specific or controllable flexibility or torque value or of rigid without revolution difference when the second input/output end drives the first input/output end.

3 Claims, 19 Drawing Sheets

БИDIRECTIONAL COUPLING DEVICE WITH
VARIABLE TRANSMISSION
CHARACTERISTICS

BACKGROUND OF THE INVENTION (a) Field of the Invention

The present invention is related to a bidirectional coupling device with variable transmission characteristics, and more particularly, to one capable of functioning as a mechanism of bidirectional revolution transmission kinetics. It is comprised of a coupler of bidirectional revolution transmission one or multiple first input/output end and one or more than one second input/output end; wherein, a continuous revolution difference can be exercised between both input/out ends when the second input/output end is driven by the first input/output end for transmission while indicating transmission characteristics that the flexibility or torque of the transmission may be of specific value or a controllable value. On the contrary, when the second input/output end drives the first input/output end for transmission, the coupler depending on the operation requirements may elect to execute continuous revolution difference with the flexibility or the torque of the transmission showing a specific value or a controllable value, or to indicate the characteristics of rigid transmission without revolution difference. The bidirectional coupling device with variable transmission characteristics of the present invention may be provided (1) at the output put of the revolution power source, (2) at the load input under instable impacts, (3) at where between the revolution power source and an inertia flywheel or a damper flywheel, (4) at where between the load and the inertia flywheel or the damper flywheel, or (5) at any other machine engaging in the transmission of revolution kinetics.

The bidirectional coupling device with variable transmission characteristics of the present invention provides a very comprehensive range of application. For example, the device may be applied in any device driven by engine power or electric power, various air, land, surface, and underwater crafts; in various types of constructional machine, industrial machine, punching machine, pressing machine, shearing machine, forging machine or tooling machine; or in any device driven by air or flow velocity, namely, wind turbine or hydraulic generator, wind actuated exhaust fan, wind actuated pump, output device of tidal energies revolution power, or any other output device of revolution power converted from flowing currents; or in manually driving devices including bicycle, sports equipment, revolution tool, generator, gears, or other manually driving devices to improve their applicability and performance.

(b) Description of the Prior Art

The conventional couplers usually are available in two types. One type is capable of engaging in flexible coupling operating on continuous revolution difference, such as the mechanical slide friction coupler, viscous fluid slide friction coupler, eddy coupler, magnetic fluid or magnetic powder coupler, gas or liquid driven fluid coupler, dual generation effect coupler and other dual flexible coupling devices of the prior art. Wherein, when the bidirectional transmission of revolution kinetics is executed between the input end and the output end, the transmission varies depending on the changed load to indicate flexible transmission with revolution difference, instead of a rigid transmission.

Another type is related to rigid coupler provided in the form of a mechanical clutch, electromagnetic clutch, or a friction type clutch driven by air, liquid, mechanical, or eccentric force of the prior art. Wherein, in the normal transmission of revolution kinetics between the input side and the output side, both sides indicate a synchronously rigid coupling without revolution difference.

The single performance of both types of the couplers of the prior art as described above is usually subject to limited application.

SUMMARY OF THE INVENTION

The primary purpose of the present invention is to provide a coupler comprised of one or multiple first input/output end and one or multiple second input/output end that is capable of executing bidirectional revolution transmission. When the first input/output end drives the second input/output end for transmission, the value of the flexibility or torque of the transmission between both ends may be specific or controllable; and when the second input/output end drives the first input/output end, the flexibility or torque value of the transmission between both ends may be specific or controllable, or the transmission relates to a rigid transmission in the absence of revolution difference depending on the operation requirements.

DETAILED DESCRIPTION OF THE PREFERRED EMBODIMENTS

Figure 1:
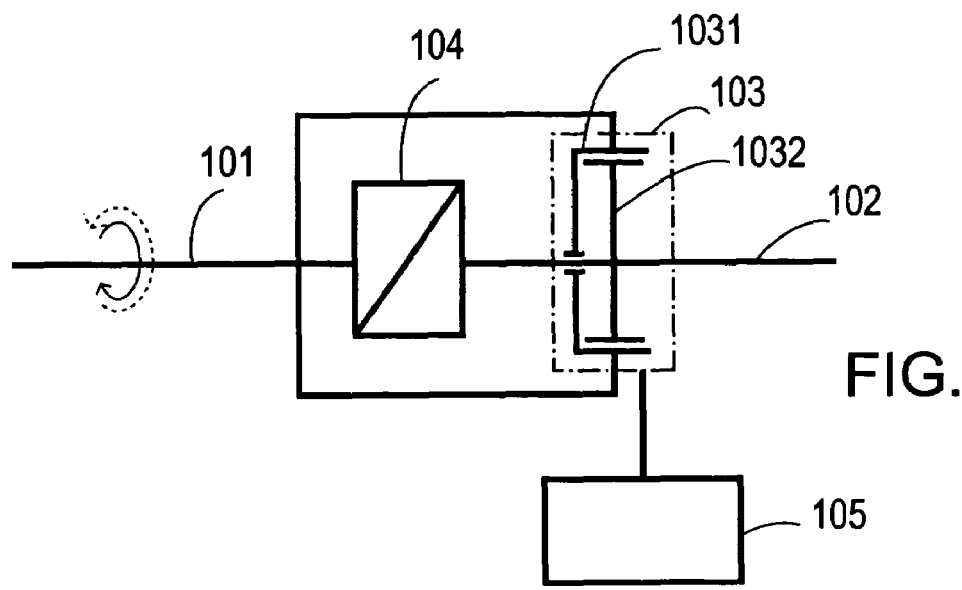
FIG. 1 is a schematic view showing the working principle of the structure of the present invention.

The present invention is related to a bidirectional-coupling device of revolution kinetics comprised of one or multiple first input/output end and one or multiple second input/output end. Wherein, when the revolution kinetics is transmitted from the first input/output end, the present invention may execute continuous revolution difference as the load varies to indicate non-rigid revolution transmission characterized by delivering the accelerating kinetics with a specific or controllable flexibility or torque value; or inversely when the second input/output end feeds the transmission of revolution kinetics back to the first input/output end, the present invention may execute continuous revolution difference as the load varies for the non-rigid revolution transmission with a specific or controllable flexibility or torque value, or as elected, the present invention may execute rigid feedback transmission of revolution kinetics without the revolution difference.

Given with the scope of function defined above, the construction of the bidirectional-coupling device with variable transmission characteristics of the present invention is characterized by that:

A flexible coupling device with specific or controllable flexibility or torque value is provided. The flexible coupling device may be of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art. The flexible coupling device includes one or multiple first input/output end and one or multiple second input/output end. In the direction of the transmission of the revolution kinetics from the first input/output end to the second input/output end, the transmission is executed through a flexible coupling mechanism with a specific or a controllable flexibility or torque value; and in the direction of the transmission of the revolution kinetics from the second input/output end to the first input/output end, the transmission is related to a flexible coupling transmission by presetting or controlling the coupling flexibility or torque value of the flexible coupling device, or to a unidirectional transmission through a rigid transmission mechanism of a mechanical, electromagnetic or other physical structure.

The flexible coupling device selected for the bidirectional-coupling device with variable transmission characteristics of the present invention may be of the same one that has the same or different specific value of flexibility or torque, or that the flexibility or torque value is controllable in both directions of transmission. When the flexible coupling device with controllable flexibility value, a device adapted for the control of the flexibility or torque value for the manipulation of the flexible coupling device is adapted. Depending on the structure and the nature of the flexible coupling device, the flexibility or torque value control device selected varies and may be of a physical structure comprised of a mechanical control device, a solid-state electronic control device, a dynamo-electric control device, electro-magnetic control device, or fluid control device so to manipulate the flexible coupling device in mechanical, electro-magnetic or other type of physical structure comprised of mechanical slide friction coupler, viscous fluid slide friction coupler, eddy coupler, magnetic fluid or powder coupler, gas or liquid fluid coupler, dual-acting generation effect coupler, or any other coupler with the similar function of the prior art. As an optional item, the flexible coupling device is provided with a mechanism of specific or controllable flexibility or torque value ranging from zero coupling (the coupling being disengaged) to the maximal flexibility or torque value (totally closed) or any part within that range.

Figure 2:
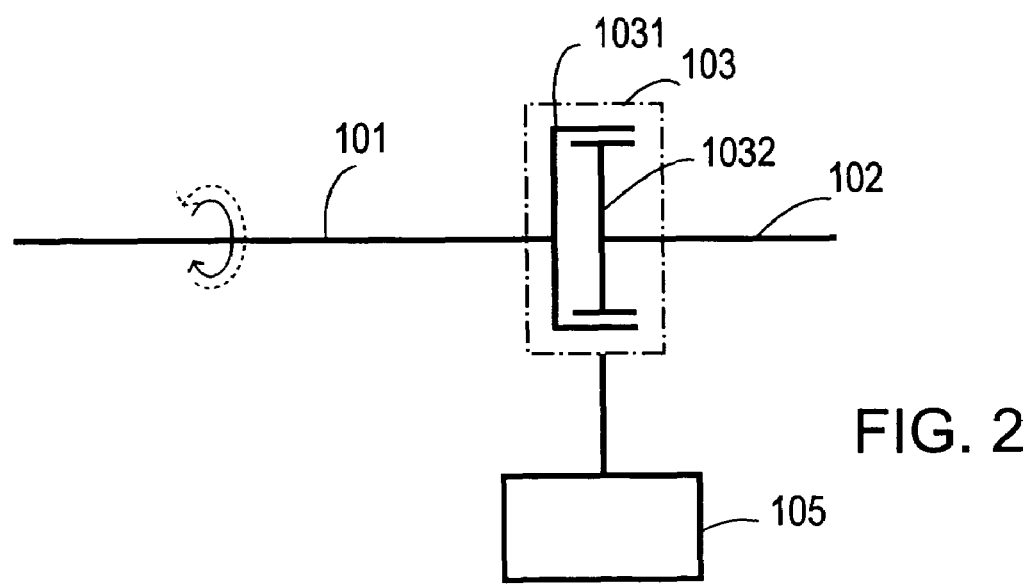
FIG. 2 is a schematic view showing the structure of the present invention is characterized by exercising bidirectional flexibility transmission without the installation of a unidirectional transmission device.

As illustrated in FIG. 1 for a schematic view showing the working principle of the structure of the present invention, the bidirectional coupling device with variable transmission characteristics is essentially comprised of:

A first input/output end 101: related to a structure for the transmission of revolution kinetics in axial, gear, disk or any other shape provided for coupling to one side of a unidirectional transmission device 104 and to the active revolution part of a flexible coupling device 103; the first input/output end may be coupled to a revolution mechanism of the prior art, or to a electric motor, internal or external combustion engine, wind or flow velocity actuation structure, a revolution part of a manually driving structure; or may be driven by revolution kinetics generated from a device driven by physical, chemical or natural energy source such as electric energy optical energy, thermal energy, manual, or fluid including wind, hydraulic and tidal energies;

A second input/output end 102: related to a structure for the transmission of revolution kinetics in axial, gear, disk or any other shape provided for coupling to the passive revolution part of the flexible coupling device 103 with a specific or controllable flexibility or torque value and further to another side of the unidirectional transmission device 104; the second input/output end is either directly or by means of a transmission device comprised of a transmission gear set of the prior art coupled to an inertial flywheel or mechanical damper device for energy storage, or a load device driven by the mechanical revolution kinetics;

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device 103 may be comprised of a physical structure in the form of a mechanical control device, solid-state electronic control device, dynamo-electric control device, electro-magnetic control device, or fluid control device provided with a mechanism of a specific or controllable flexibility or torque value to control the flexibility or torque value of the flexible coupling device for a range from zero coupling (coupling being disengaged) up to the maximal flexibility or torque value (totally closed);

The unidirectional transmission device 104: related to a unidirectional clutch, or any other unidirectional transmission device that is capable of executing rigid transmission in one revolution direction and idling in the opposite revolution direction of the prior art; one end of the unidirectional transmission device 104 is coupled to the first input/output end 101 of the flexible coupling device 103, and the other end, to the passive revolution part of the flexible coupling device 103; so that in one coupling transmission direction, the rigid transmission is executed and in the other coupling transmission direction, the flexible transmission is executed; the unidirectional transmission device 104 is optional as illustrated in FIG. 2 for a schematic view showing the structure of the present invention is characterized by exercising bidirectional flexibility transmission without the installation of a unidirectional transmission device; and A flexibility or torque value control device 105: related to an optional item provided for controlling the flexible coupling device 103; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electro-magnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different.

By means of the structure as described above, the first input/output end 101 delivers the revolution kinetics through a non-rigid transmission, i.e., the flexible transmission to the second input/output end 102; on the contrary, the means for the second input/output end 102 to feed the revolution kinetics back to the first input/output end 101 includes the adaptation of the unidirectional transmission device 104 for the second input/output end 102 to execute rigid transmission of the revolution kinetics without revolution difference through the unidirectional transmission device 104 to feedback to the first input/output end 101. In the absence of the unidirectional transmission device, the optional flexible coupling device 103 indicate identical or different flexible coupling characteristics in both directions. Or, alternatively, another flexible coupling device 103 with its flexibility or torque value different from that of the flexible coupling device 103 is provided to execute the flexible transmission of the revolution kinetics from the second input/output end 102 back to the first input/output end 101.

Figure 3:
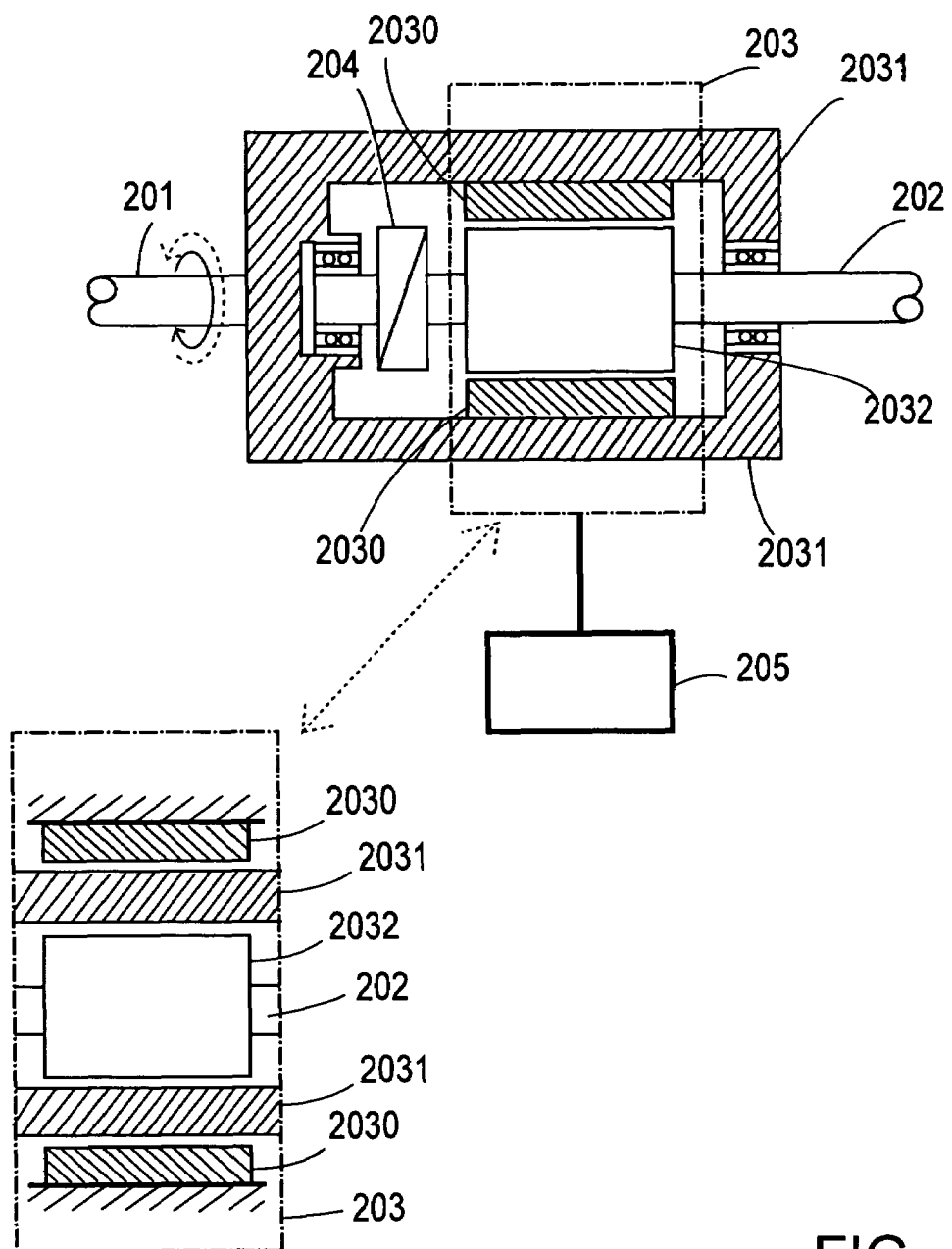
FIG. 3 is a schematic view showing a preferred embodiment of a bi-state coupling device comprised of an eddy coupler and a unidirectional transmission device based on the structure illustrated in FIG.
Figure 4:
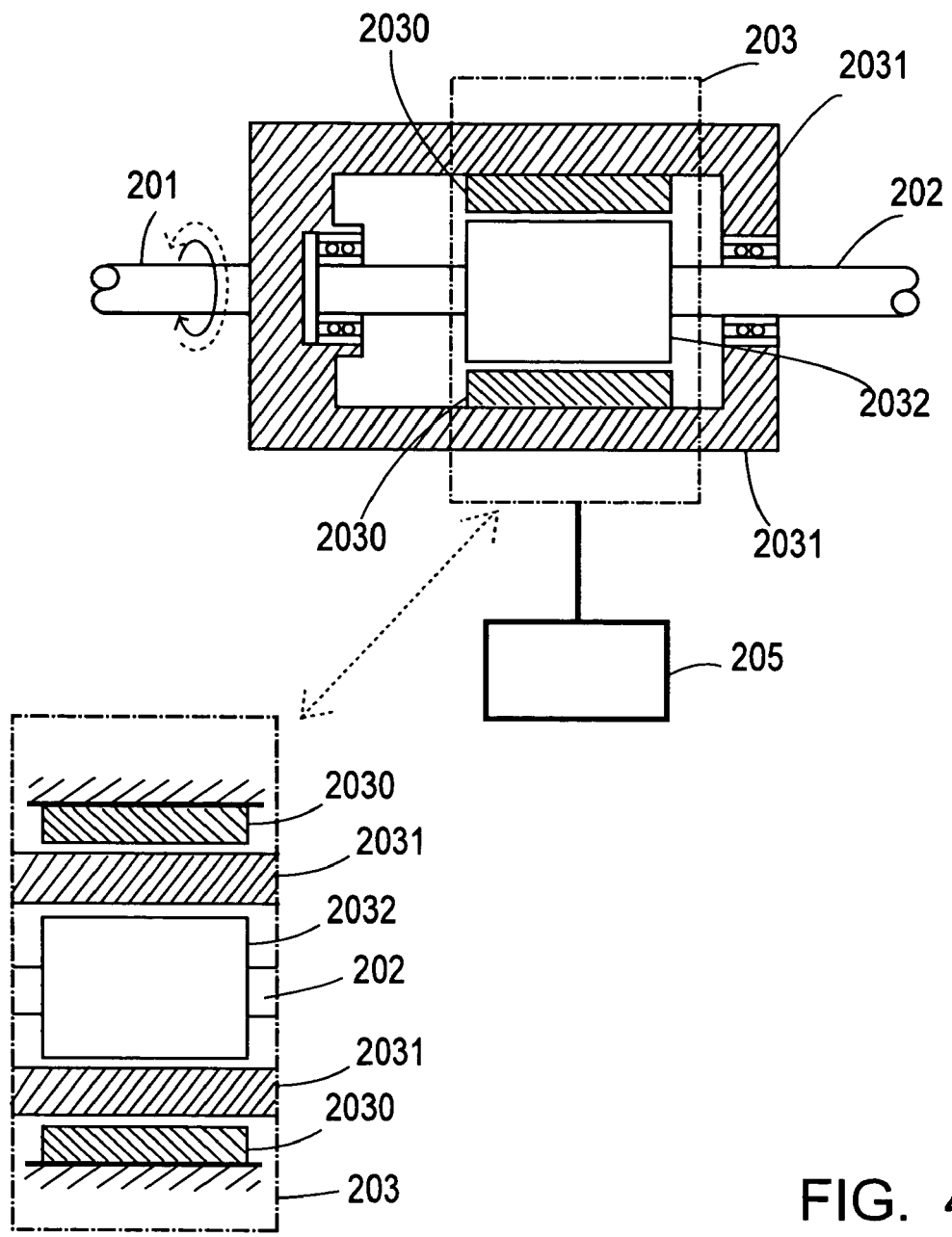
FIG. 4 is a schematic view showing a preferred embodiment of a bi-state coupling device comprised of the eddy coupler to execute bidirectional transmission without the installation of the unidirectional transmission device based on the structure illustrated in FIG. 3.

FIG. 3 is a schematic view showing a preferred embodiment of a bi-state coupling device comprised of an eddy coupler and a unidirectional transmission device based on the structure illustrated in FIG. 1. The preferred embodiment is essentially comprised of:

A first input/output end 201: related to a structure for the transmission of revolution kinetics in axial, gear, disk or any other shape provided for coupling to one side of a unidirectional transmission device 204 and to an active revolution part 2031 of an eddy coupler; it may also be coupled to a revolution mechanism of the prior art, or to a electric motor, internal or external combustion engine, wind or flow velocity actuation structure, a revolution part of a manually driving structure; or may be driven by revolution kinetics generated from a device driven by physical, chemical or natural energy source such as electric energy, optical energy, thermal energy, manual, or fluid including wind, hydraulic and tidal energies;

A second input/output end 202: related to a structure for the transmission of revolution kinetics in axial, gear, disk or any other shape provided for coupling to a passive revolution part 2032 of the eddy coupler, and then to the other side of the unidirectional transmission device 204; and the second input/output end is provided to directly couple or by means of a transmission device comprised of transmission gear set to a load device, which is driven by an inertia flywheel or mechanical damper device for energy storage, or by kinetics of any other mechanical revolution;

An eddy coupler 203: available in two structure types for option; one type is related to a magnetic field structure 2030 comprised of excitement windings excited by permanent magnet or electric current that is provided at the active revolution part 2031 of the eddy coupler; and another type relates to a fixed magnetic field structure 2030 provided with a revolution intermediate magnetic route structure serving as the active revolution part 2031 of the eddy coupler while an eddy conductor serves as the passive revolution part 2032 of the eddy coupler. Accordingly, when the active revolution part 2031 comprised of the intermediate magnetic route in the eddy coupler revolves as driven by the first input/output end 201, a relative speed difference is created by eddy effect as the load changes between the active revolution part 2031 and the second input/output end 202, thus to execute flexible transmission to draw the passive revolution part 2032 of the eddy coupler and drive the second input/output end 202. The relation between the coupling of the active revolution part 2031 of the eddy coupler and the first input/output end 201 as well as the coupling of the passive revolution part 2032 of the eddy coupler and the second input/output end 202 can be exchanged to such that between the coupling of the active revolution part 2031 of the eddy coupler and the second input/output end 202 as well as the coupling of the passive revolution part 2032 of the eddy coupler and the first input/output end 201;

The unidirectional transmission device 204: related to an optional item comprised of a unidirectional clutch or any other unidirectional transmission device of the prior art that is capable of executing a rigid transmission in one direction and executing an idling in the opposite direction; one end of the unidirectional transmission device 204 is coupled to the first input/output end 201 of the eddy coupler 203 and the other end, to the passive revolution part 2032 of the eddy coupler 203 so that the rigid transmission is executed in one direction of coupling transmission while the flexible transmission is executed in another direction of coupling transmission. FIG. 4 is a schematic view showing a preferred embodiment of a bi-state coupling device comprised of the eddy coupler to execute bidirectional transmission without the installation of the unidirectional transmission device based on the structure illustrated in FIG. 3; and A flexibility or torque value control device 205: an optional item related to a flexibility or torque value control device comprised of mechanical, dynamoelectric or solid-state electronic circuit for the control of the eddy coupler.

With the structure as described above, the revolution kinetics is delivered in flexible transmission from the first input/output end 201 by means of the eddy coupling effect to the second input/output end 202; on the contrary, the revolution kinetics is fed in rigid transmission without transmission difference from the second input/output end 202 back to the first input/output end 201 through the unidirectional transmission device 204; or in the absence of the unidirectional transmission device 204, the second input/output end 202 drives the eddy coupler to deliver in flexible transmission the revolution kinetics to the first input/output end 201.

Figure 5:
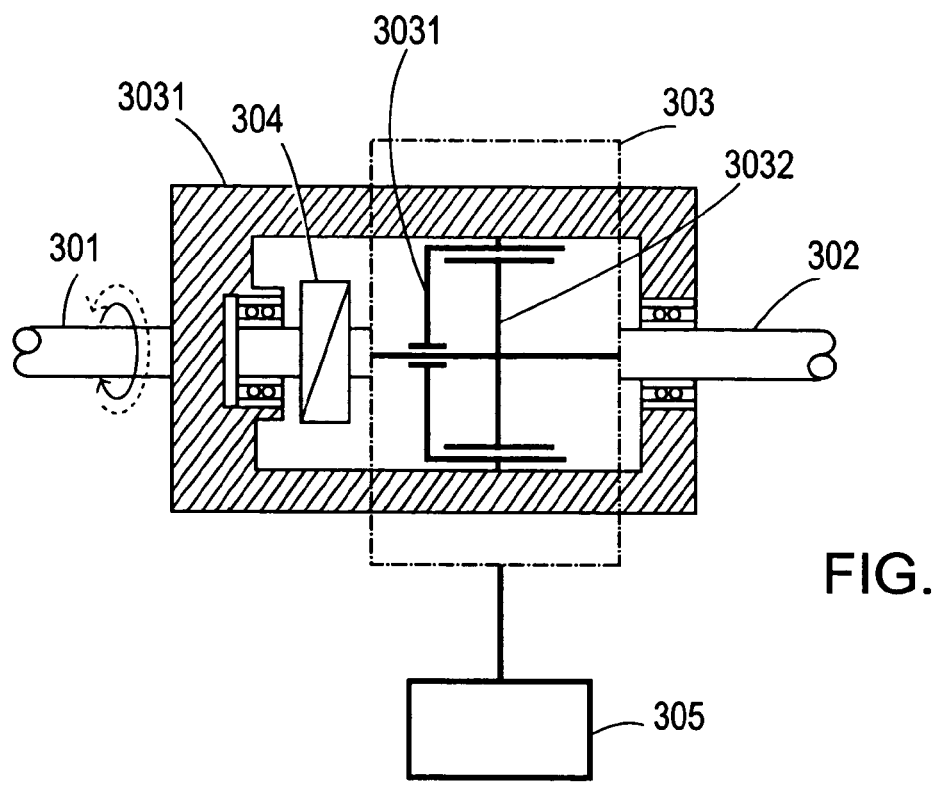
FIG. 5 is a schematic view showing a preferred embodiment of a bi-state coupling device comprised of a magnetic fluid or magnetic powder coupler and the unidirectional transmission device based on the structure illustrated in FIG. 1.
Figure 6:
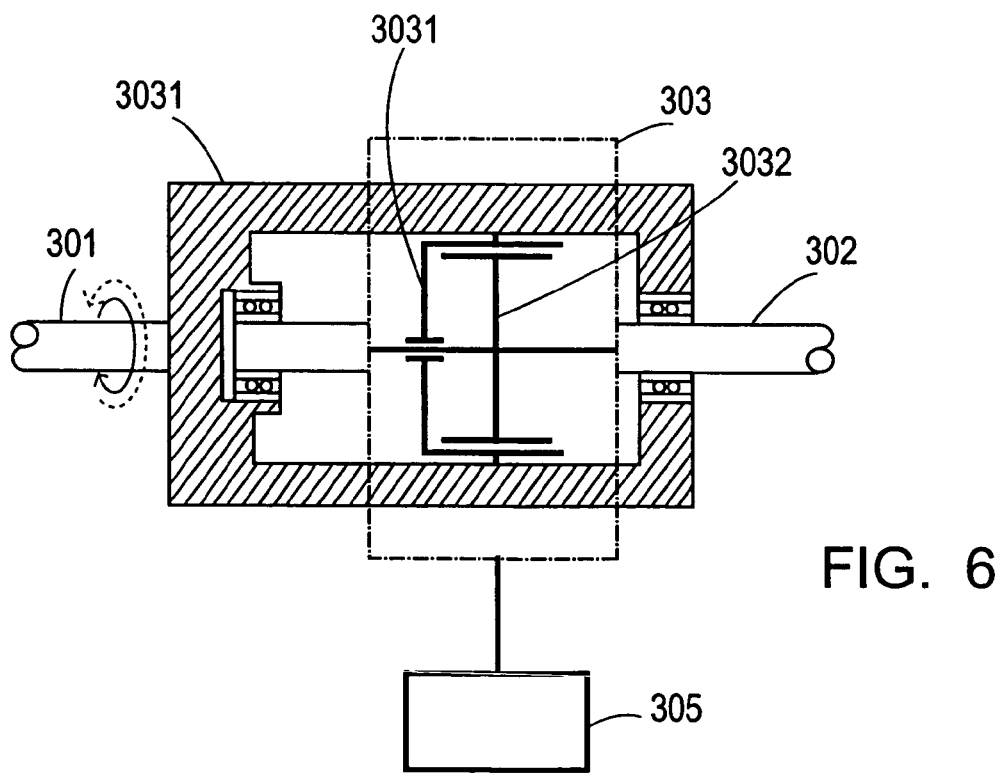
FIG. 6 is a schematic view showing a preferred embodiment of a bi-state coupling device comprised of the magnetic fluid or magnetic powder to execute bidirectional transmission without the installation of the unidirectional transmission device based on the structure illustrated in FIG. 5.

FIG. 5 is a schematic view showing a preferred embodiment of a bi-state coupling device comprised of a magnetic fluid or magnetic powder coupler and the unidirectional transmission device based on the structure illustrated in FIG. 1. The preferred embodiment is essentially comprised of:

A first input/output end 301: related to a structure for the transmission of revolution kinetics in axial, gear, disk or any other shape provided for coupling to one side of a unidirectional transmission device 304 and to an active revolution part 3031 of a fluid coupler; it may also be coupled to a revolution mechanism of the prior art, or to a electric motor, internal or external combustion engine, wind or flow velocity actuation structure, a revolution part of a manually driving structure; or may be driven by revolution kinetics generated from a device driven by physical, chemical or natural energy source such as electric energy, optical energy, thermal energy, manual, or fluid including wind, hydraulic and tidal energies;

A second input/output end 302: related to a structure for the transmission of revolution kinetics in axial, gear, disk or any other shape provided for coupling to a passive revolution part 3032 of the fluid coupler, and then to the other side of the unidirectional transmission device 304; and the second input/output end is provided to directly couple or by means of a transmission device comprised of transmission gear set to a load device, which is driven by an inertia flywheel or mechanical damper device for energy storage, or by kinetics of any other mechanical revolution;

A magnetic fluid or magnetic powder coupler 303: is provided with an active revolution part 3031 for coupling to the first input/output end 301, a passive revolution part 3032 driven by a magnetic fluid or powder, and a casing; so that when the active revolution part 3031 is driven by the first input/output end 301 to revolve, the magnetic fluid or powder is used as the intermediate transmission to transmit the kinetics to create relative revolution difference as the load changes for executing the flexible transmission to drive the passive revolution part 3032 to further drive the second input/output end 302; the relation between the coupling of the active revolution part 3031 of the magnetic fluid or powder coupler and the first input/output end 301 as well as the coupling between the passive revolution part 3032 of the coupling of the magnetic fluid or powder coupler and the second input/output end 302 can be exchanged to such that between the coupling of the active revolution part 3031 of the magnetic fluid or powder coupler and the second input/output end 302 as well as the coupling between the passive revolution part 3032 of the coupling of the magnetic fluid or powder coupler and the first input/output end 301;

The unidirectional transmission device 304: related to an optional item comprised of a unidirectional clutch or any other unidirectional transmission device of the prior art that is capable of executing a rigid transmission in one direction and executing an idling in the opposite direction; one end of the unidirectional transmission device is coupled to the first input/output end 301 of the magnetic fluid or powder coupler 303 and the other end, to the passive revolution part 3032 of the magnetic fluid or powder coupler 303 so that the rigid transmission is executed in one direction of coupling transmission while the flexible transmission is executed in another direction of coupling transmission. FIG. 6 is a schematic view showing a preferred embodiment of a bi-state coupling device comprised of the magnetic fluid or magnetic powder to execute bidirectional transmission without the installation of the unidirectional transmission device based on the structure illustrated in FIG. 5; and A flexibility or torque value control device 305: an optional item related to a flexibility or torque value control device comprised of mechanical, dynamoelectric or solid-state electronic circuit for the control of the amperage of the exciting current, and for the selection and control of the flexibility or torque value for the magnetic fluid or powder coupler 303.

With the structure as described above, the revolution kinetics is delivered in flexible transmission from the first input/output end 301 by means of the magnetic fluid or powder to the second input/output end 302; on the contrary, the revolution kinetics is fed in rigid transmission without transmission difference from the second input/output end 302 back to the first input/output end 301 through the unidirectional transmission device 304; or in the absence of the unidirectional transmission device 304, the second input/output end 302 drives he magnetic fluid or powder coupler to deliver the revolution kinetics in flexible transmission to the first input/output end 301.

Figure 7:
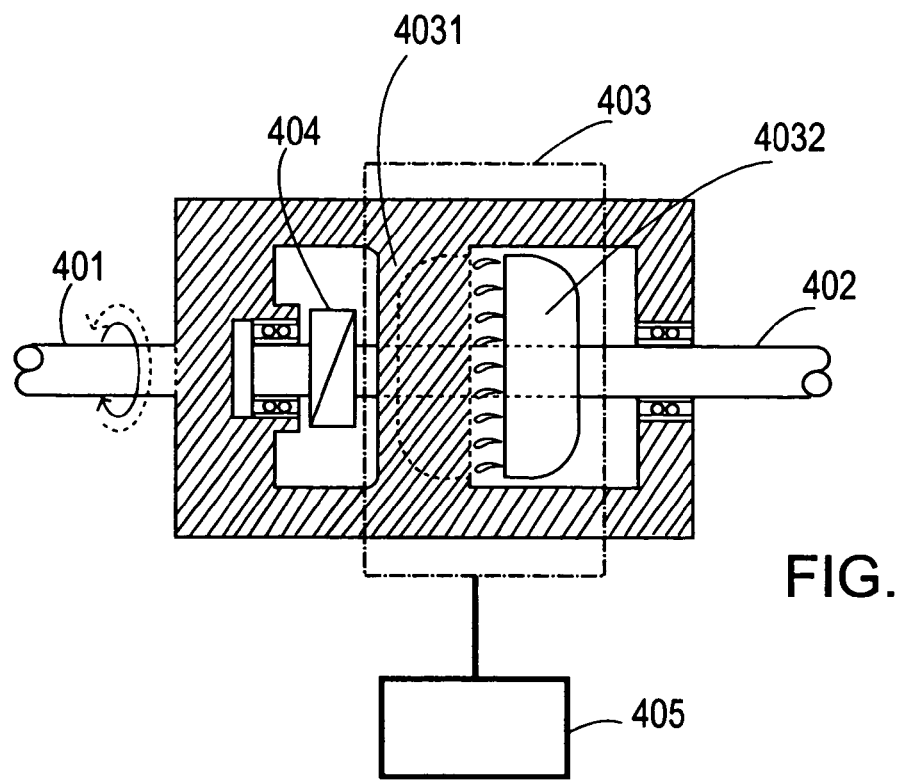
FIG. 7 is a schematic view showing a preferred embodiment of a bi-state coupling device comprised of a gas or fluid driving fluid coupler and the unidirectional transmission device based on the structure illustrated in FIG. 1.
Figure 8:
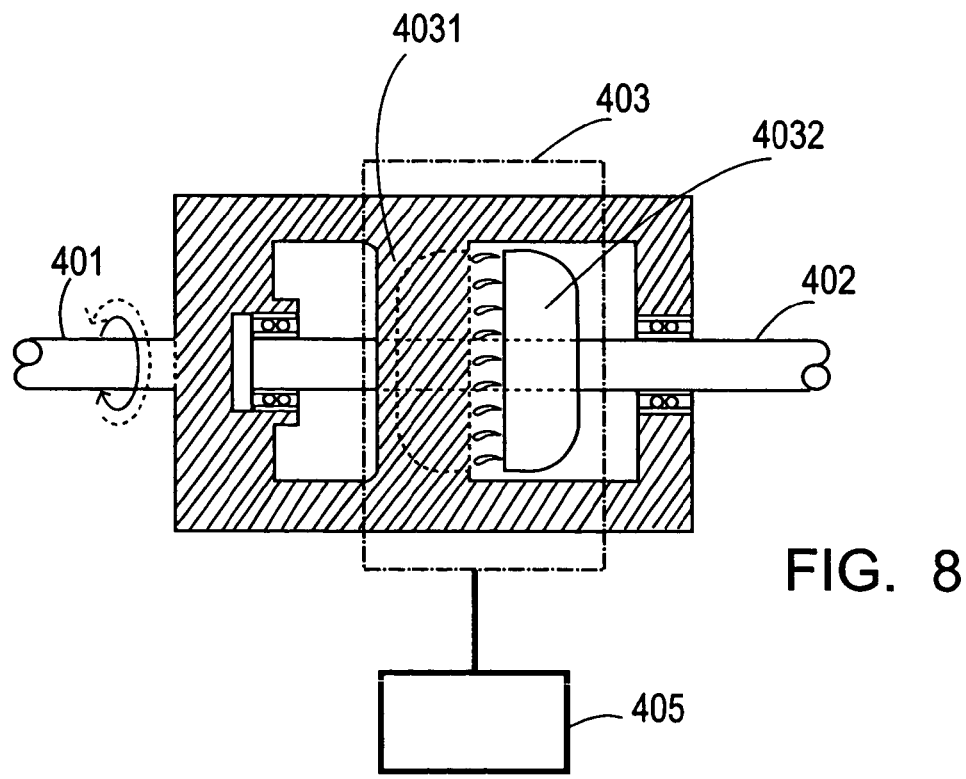
FIG. 8 is a schematic view showing a preferred embodiment of a bi-state coupling device comprised of a gas or liquid driving fluid coupler to execute bidirectional transmission without the installation of the unidirectional transmission device based on the structure illustrated in FIG. 7.

FIG. 7 is a schematic view showing a preferred embodiment of a bi-state coupling device comprised of a gas or fluid driving fluid coupler and the unidirectional transmission device based on the structure illustrated in FIG. 1. The preferred embodiment is essentially comprised of:

A first input/output end 401: related to a structure for the transmission of revolution kinetics in axial, gear, disk or any other shape provided for coupling to one side of a unidirectional transmission device 404 and to an active revolution part 4031 of a fluid coupler; it may also be coupled to a revolution mechanism of the prior art, or to a electric motor, internal or external combustion engine, wind or flow velocity actuation structure, a revolution part of a manually driving structure; or may be driven by revolution kinetics generated from a device driven by physical, chemical or natural energy source such as electric energy, optical energy, thermal energy, manual, or fluid including wind, hydraulic and tidal energies;

A second input/output end 402: related to a structure for the transmission of revolution kinetics in axial, gear, disk or any other shape provided for coupling to a passive revolution part 4032 of the fluid coupler, and then to the other side of the unidirectional transmission device 404; and the second input/output end is provided to directly couple or by means of a transmission device comprised of transmission gear set to a load device, which is driven by an inertia flywheel or mechanical damper device for energy storage, or by kinetics of any other mechanical revolution;

A fluid coupler 403: an active revolution part 4031 of the fluid coupler provided with blades to produce actuating flow velocity for coupling to the first input/output end 401, a passive revolution part 4032 of the fluid coupler driven by flow velocity, and a casing; so that when the active revolution part 4031 of the fluid coupler is driven by the first input/output end 401 to revolve, the air or the liquid is used as the intermediate transmission to transmit the kinetics to create relative revolution difference as the load changes for executing the flexible transmission to drive the passive revolution part 4032 of the fluid coupler to further drive the second input/output end 402; the relation between the coupling of the active revolution part 4031 of the fluid coupler and the first input/output end 401 as well as the coupling between the passive revolution part 4032 of the fluid coupler and the second input/output end 402 can be exchanged to such that between the coupling of the active revolution part 4031 of the fluid coupler and the second input/output end 402 as well as the coupling between the passive revolution part 4032 of the coupling of the fluid coupler and the first input/output end 401;

The unidirectional transmission device 404: related to an optional item comprised of a unidirectional clutch or any other unidirectional transmission device of the prior art that is capable of executing a rigid transmission in one direction and executing an idling in the opposite direction; one end of the unidirectional transmission device is coupled to the first input/output end 401 of the fluid coupler 403 and the other end, to the passive revolution part 4032 of the fluid coupler 403 so that the rigid transmission is executed in one direction of coupling transmission while the flexible transmission is executed in another direction of coupling transmission. FIG. 8 is a schematic view showing a preferred embodiment of a bi-state coupling device comprised of a gas or liquid driving fluid coupler to execute bidirectional transmission without the installation of the unidirectional transmission device based on the structure illustrated in FIG. 7; and A flexibility or torque value control device 405: an optional item related to a flexibility or torque value control device comprised of mechanical, dynamoelectric or solid-state electronic circuit for the control of the flexibility or torque value for the fluid coupler by air or liquid.

With the structure as described above, the revolution kinetics is delivered in flexible transmission from the first input/output end 401 by means of the magnetic fluid or powder to the second input/output end 402; on the contrary, the revolution kinetics is fed in rigid transmission without transmission difference from the second input/output end 402 back to the first input/output end 401 through the unidirectional transmission device 404; or in the absence of the unidirectional transmission device 404, the second input/output end 402 drives the fluid coupler to deliver the revolution kinetics in flexible transmission to the first input/output end 401.

Figure 9:
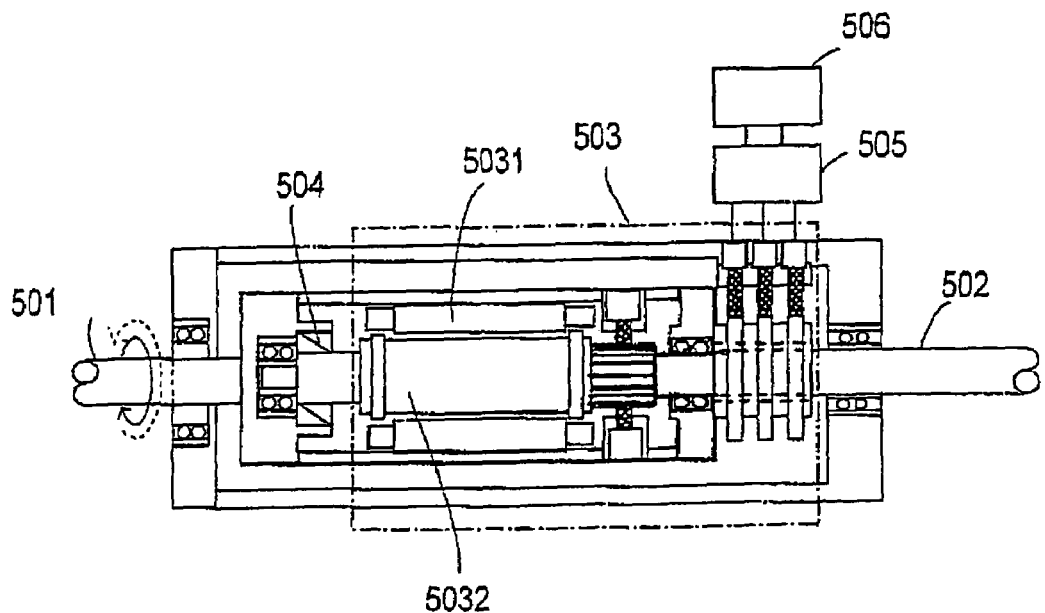
FIG. 9 is a schematic view showing a preferred embodiment of a bi-state coupling device comprised of a dual-acting generation effect coupler and the unidirectional transmission device based on the structure illustrated in FIG. 1.
Figure 10:
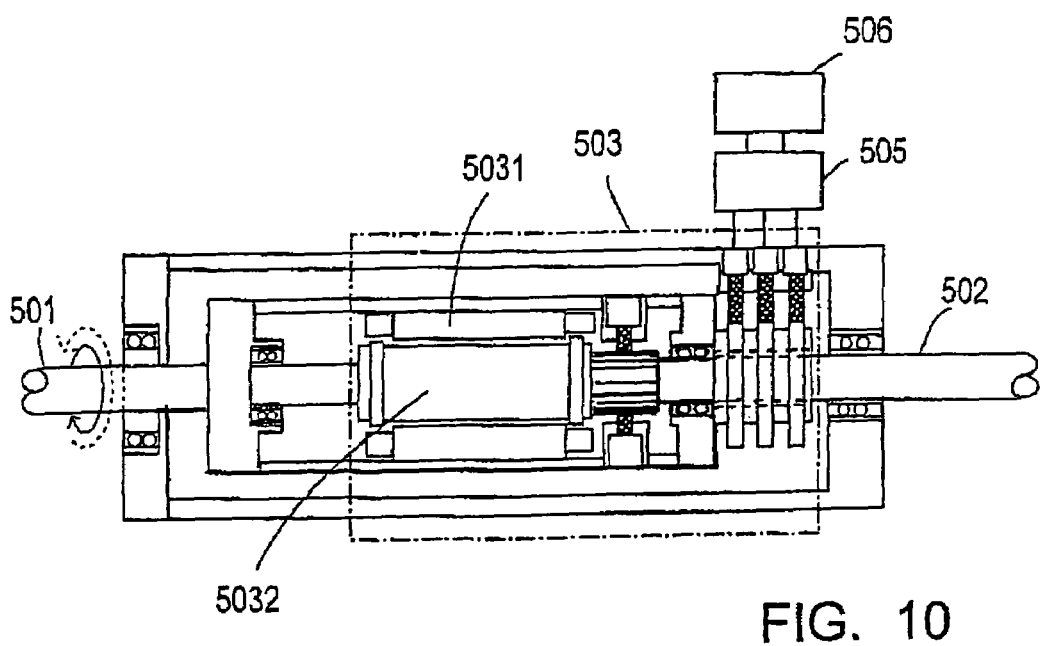
FIG. 10 is a schematic view showing a preferred embodiment of a bi-state coupling device comprised of the dual-acting generation effect coupler to execute bidirectional transmission without the installation of the unidirectional transmission device based on the structure illustrated in FIG. 9.

FIG. 9 is a schematic view showing a preferred embodiment of a bi-state coupling device comprised of a dual-acting generation effect coupler and the unidirectional transmission device based on the structure illustrated in FIG. 1. The preferred embodiment is essentially comprised of:

A first input/output end 501: related to a structure for the transmission of revolution kinetics in axial, gear, disk or any other shape provided for coupling to one side of a unidirectional transmission device 504 and to an active revolution part 5031 of a generation effect coupler; it may also be coupled to a revolution mechanism of the prior art, or to a electric motor, internal or external combustion engine, wind or flow velocity actuation structure, a revolution part of a manually driving structure; or may be driven by revolution kinetics generated from a device driven by physical, chemical or natural energy source such as electric energy, optical energy, thermal energy, manual, or fluid including wind, hydraulic and tidal energies;

A second input/output end 502: related to a structure for the transmission of revolution kinetics in axial, gear, disk or any other shape provided for coupling to a passive revolution part 5032 of the generation effect coupler, and then to the other side of the unidirectional transmission device 504; and the second input/output end is provided to directly couple or by means of a transmission device comprised of transmission gear set to a load device, which is driven by an inertia flywheel or mechanical damper device for energy storage, or by kinetics of any other mechanical revolution;

A dual-acting generation effect coupler 503: includes a dynamoelectric field structure comprised of permanent magnet or excitement windings excited by electric current to serve as an active revolution part 5031 of the dual-acting generation effect coupler 503, and a dynamoelectric armature engaging in relative revolution to serve a passive revolution part 5032 of the dual-acting generation effect coupler 503. The active revolution part 5031 of the generation effect coupler is coupled to a first input/out end 501, and the passive revolution part 5032 of the generation effect coupler, to a second input/output end 502. Both parts control the generation energy transmitted from the dual-acting generation effect coupler 503 to a load 506 through a flexibility or torque value control circuit 505 to such that when the first input/output end 501 revolves to drive the active revolution part 5031 of the dual-acting generation effect coupler 503, a relative transmission difference and flexibility or torque value is created between the active revolution part 5031 and the passive revolution part 5032 by controlling the generation energy transmitted to the load, thus to drive in a fashion of flexibility the passive revolution part 5032 and further to drive the second input/output end 502. The relation between the coupling of the active revolution part 5031 of the dual-acting generation effect coupler 503 and the first input/output end 501 as well as the coupling between the passive revolution part 5032 of the dual-acting generation effect coupler 503 and the second input/output end 502 can be also such that relation between the coupling of the active revolution part 5031 of the dual-acting generation effect coupler 503 and the second input/output end 502 as well as the coupling between the passive revolution part 5032 of the coupling of the dual-acting generation effect coupler 503 and the first input/output end 501;

The unidirectional transmission device 504: related to an optional item comprised of a unidirectional clutch or any other unidirectional transmission device of the prior art that is capable of executing a rigid transmission in one direction and executing an idling in the opposite direction; one end of the unidirectional transmission device is coupled to the first input/output end 501 of the dual-acting generation effect coupler 503 and the other end, to the passive revolution part 5032 of the dual-acting generation effect coupler 503 so that the rigid transmission is executed in one direction of coupling transmission while the flexible transmission is executed in another direction of coupling transmission. FIG. 10 is a schematic view showing a preferred embodiment of a bi-state coupling device comprised of the dual-acting generation effect coupler to execute bidirectional transmission without the installation of the unidirectional transmission device based on the structure illustrated in FIG. 9;

A flexibility or torque value control device 505: an optional item related to a generation load control circuit comprised of mechanical, dynamoelectric or solid-state electronic circuit to control the outputted voltage, amperage, generation output power, polarity (in case of DC), or phase and frequency (in case of AC) from the dual-acting generation effect coupler 503 engaging in unidirectional or bidirectional operation; and A load 506: the city power system becomes the load when the power generated by the dual-acting generation effect coupler supplies the power in parallel to the city power system, or supplies the power to a resistance or other electric energy actuated load, or to an energy storage device that becomes the load for the dual-acting generation effect coupler 503 to generate and supply power to the load; accordingly, a unidirectional or bidirectional flexible coupling function is achieved between the active revolution part 5031 and the passive revolution part 5032, and the outputted power is controlled by the optional flexibility or torque value control device 505.

With the structure as described above, the revolution kinetics is delivered in flexible transmission from the first input/output end 501 by means of the dual-acting generation effect coupler to the second input/output end 502; on the contrary, the revolution kinetics is fed in rigid transmission without transmission difference from the second input/output end 502 back to the first input/output end 501 through the unidirectional transmission device 504; or in the absence of the unidirectional transmission device 504, the second input/output end 502 drives the dual-acting generation effect coupler to deliver the revolution kinetics in flexibly transmission to the first input/output end 501.

Figure 11:
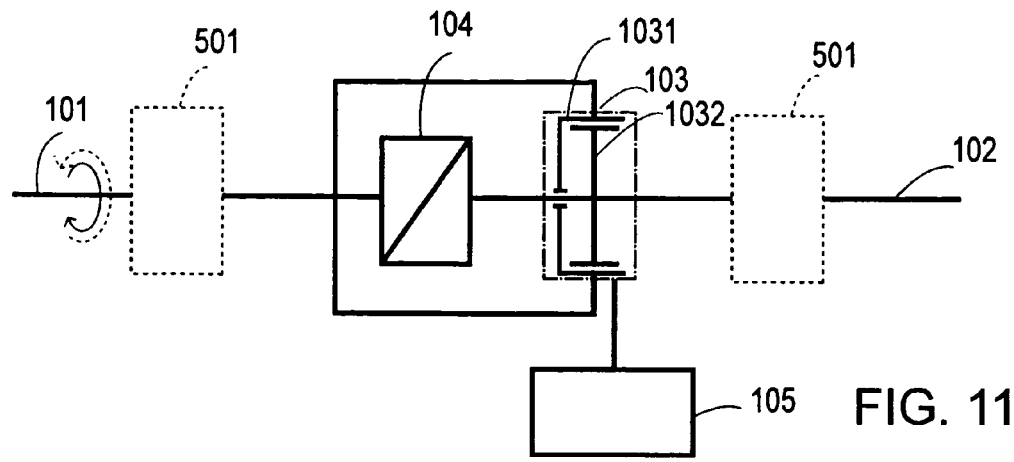
FIG. 11 is a schematic view showing that a controllable clutch is adapted to the input side or output side of the preferred embodiment illustrated in FIG. 1.
Figure 12:
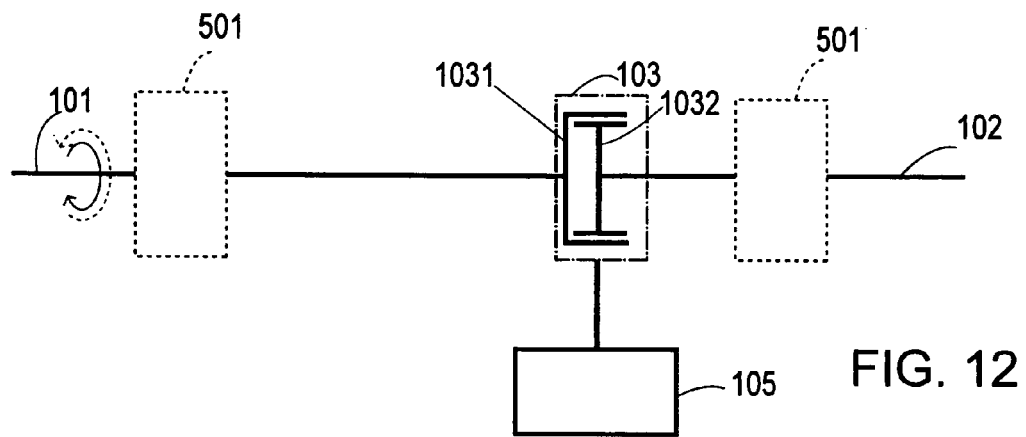
FIG. 12 is a schematic view showing that the structure of the preferred embodiment illustrated in FIG. 11 without the installation of the unidirectional transmission device.

The bidirectional coupling device with variable transmission characteristics may be provided with a controllable clutch at the first or the second input/output end depending on the operation requirements for the bidirectional coupling device with variable transmission characteristics to achieve the mixed control. FIG. 11 is a schematic view showing that a controllable clutch is adapted to the input side or output side of the preferred embodiment illustrated in FIG. 1. The preferred embodiment is essentially comprised of:

The first input/output end 101: related to a structure for the transmission of revolution kinetics in axial, gear, disk or any other shape provided for coupling to one side of the unidirectional transmission device 104 and to an active revolution part of the flexible coupling device 103; the first input/output end may be coupled to a revolution mechanism of the prior art, or to a electric motor, internal or external combustion engine, wind or flow velocity actuation structure, a revolution part of a manually driving structure; or may be driven by revolution kinetics generated from a device driven by physical, chemical or natural energy source such as electric energy, optical energy, thermal energy, manual, or fluid including wind, hydraulic and tidal energies;

The second input/output end 102: related to a structure for the transmission of revolution kinetics in axial, gear, disk or any other shape provided for coupling to a passive revolution part of the flexible coupling device 103, and then to the other side of the unidirectional transmission device 104; and the second input/output end is provided to directly couple or by means of a transmission device comprised of transmission gear set to a load device, which is driven by an inertia flywheel or mechanical damper device for energy storage, or by kinetics of any other mechanical revolution;

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device 103 may be comprised of a physical structure in the form of a mechanical control device, solid-state electronic control device, dynamo-electric control device, electro-magnetic control device, or fluid control device provided with a mechanism of a specific or controllable flexibility or torque value to control the flexibility or torque value of the flexible coupling device;

The unidirectional transmission device 104: related to a unidirectional clutch, or any other unidirectional transmission device that is capable of executing rigid transmission in one revolution direction and idling in the opposite revolution direction of the prior art; one end of the unidirectional transmission device 104 is coupled to the first input/output end 101 of the flexible coupling device 103, and the other end, to the passive revolution part of the flexible coupling device 103; so that in one coupling transmission direction, the rigid transmission is executed and in the other coupling transmission direction, the flexible transmission is executed; the unidirectional transmission device 104 is optional as illustrated in FIG. 12 is a schematic view showing that the structure of the preferred embodiment illustrated in FIG. 11 without the installation of the unidirectional transmission device; and A flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different.

With the structure described above, the revolution kinetics is transmitted form the first input/output end 101 in flexible transmission to the second input/output end 102; on the contrary, the revolution kinetics is fed from the second input/output end 102 in rigid transmission without the transmission difference back to the first input/output end 101; or in the absence of the unidirectional transmission device, the bidirectional and flexible coupling characteristics of the flexible coupling device 103, or another flexible coupling device having different flexibility or torque value form that of the flexible coupling device 103 is provided to transmit the revolution kinetics form the second input/output end 102 back to the first input/output end 101; and The controllable clutch 501: related to an optional item that can be controlled by manual, mechanical, electromagnetic force or flow velocity to close up the transmission and disengaging from the transmission for further control of the external transmission executed by the first input/output end 101, or control of the external transmission executed by the second input/output end 102; the controllable clutch 501 may be provided at either or both of the first input/output end 101 and the second input/output end 102 according to the operation requirements.

Depending on the operation requirements, one or multiple flexible coupling device and one or multiple unidirectional transmission device may be provided in series, parallel, series-parallel power transmission combination for the bidirectional coupling device with variable transmission characteristics of the present invention.

Figure 13:
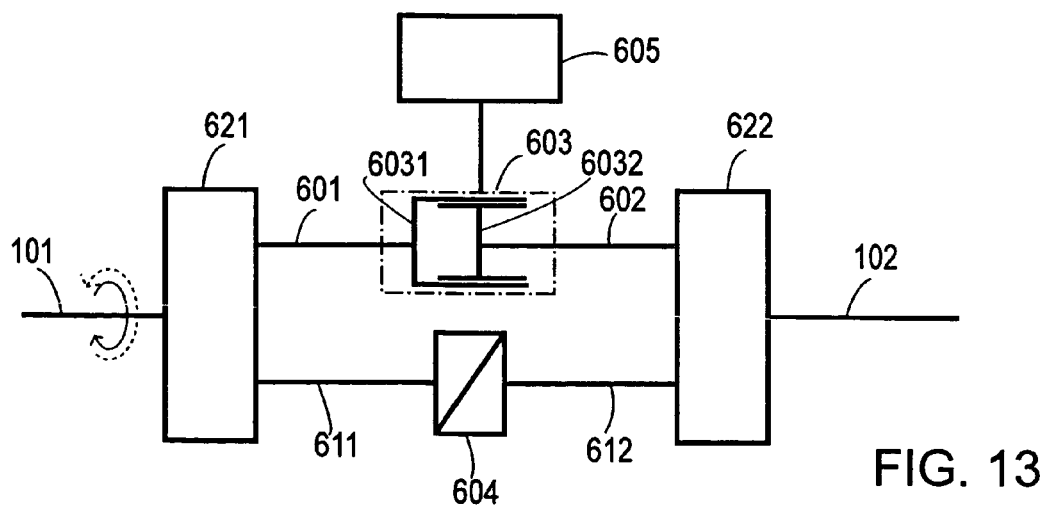
FIG. 13 is a schematic view showing that a bi-state coupler of the present invention is comprised of a flexible coupling device and the unidirectional transmission device engaging in parallel transmission.

FIG. 13 is a schematic view showing that a bi-state coupler of the present invention is comprised of a flexible coupling device and the unidirectional transmission device engaging in parallel transmission. Wherein, the preferred embodiment is essentially comprised of one or multiple flexible coupling device 603 including a first input/output end 601 and a second input/output end 602, and one or multiple unidirectional transmission device 604 including a selected first input/output end 611 and a selected second input/output end 612. A transmission device 621 comprised of a transmission gear set of the prior art is disposed between the first input/output end 601 of the flexible coupling device 603 and the first input/output end 611 of the unidirectional transmission device 604 to couple the revolution power source, the first input/output end 601, and the first input/output end 611 for all them to execute mutual transmission among one another; another transmission device 622 comprised of a transmission gear set of the prior art is disposed between the second input/output end 602 of the flexible coupling device 603 and the second input/out end 612 of the unidirectional transmission device 604 to couple a load, the second input/output end 602 and the second input/output end 612 for them to execute mutual transmission among one another;

The flexible coupling device 603: related to a device with specific or controllable flexibility or torque value is provided, the flexible coupling device may be of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler provided with the similar functions, including an active revolution part 6031 and a passive revolution part 6032 with both capable of delivering revolution kinetics in non-rigid coupling transmission with continuous revolution difference. In either or both transmission direction of the flexible coupling device 603, the flexible coupling device 603 may be comprised of a mechanical, dynamoelectric or other physical structure provided with a mechanism of specific or controllable flexibility or torque value;

A flexibility or torque value control device 605: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different.

Depending on the operation requirements, this applied structure of a bidirectional coupling device with variable transmission characteristics may be further adapted with a controllable clutch including (1) a controllable clutch 1001 is provided in series with the unidirectional transmission device, or (2) a controllable clutch 1002 is provided between the active and the passive revolution parts of the flexible coupling device to add more controllable operation functions.

Figure 14:
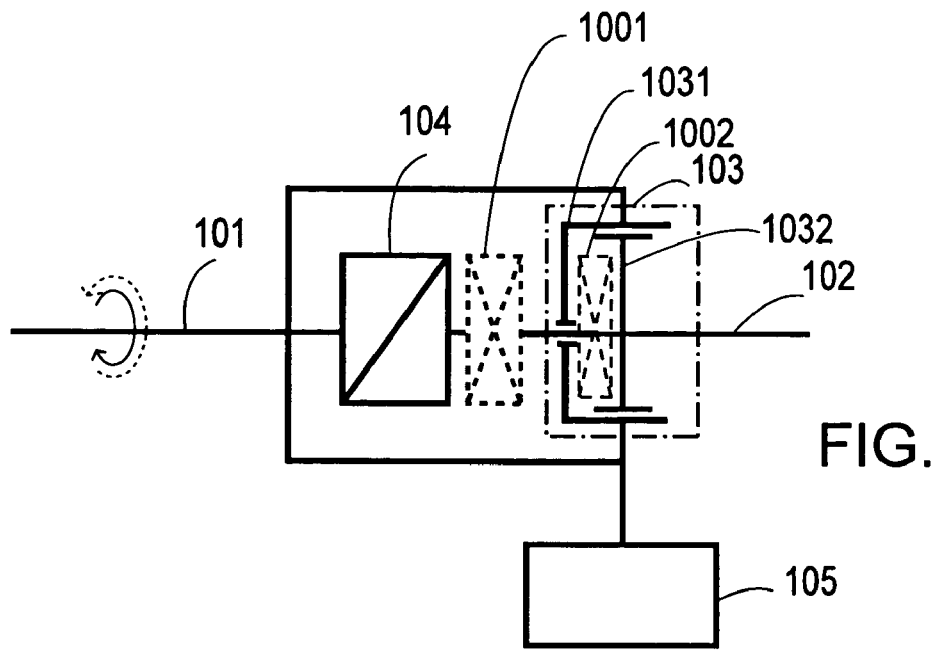
FIG. 14 is a schematic view showing that the preferred embodiment as illustrated in FIG. 1 is further provided in series with a controllable clutch to the unidirectional transmission device, or provided at where between the active and the passive revolution parts.

FIG. 14 is a schematic view showing that the preferred embodiment as illustrated in FIG. 1 is further provided in series with a controllable clutch to the unidirectional transmission device, or provided at where between the active and the passive revolution parts. Additional to the unidirectional transmission device 104, the preferred embodiment is essentially comprised of:

The controllable clutch 1001: related to an optional item provided in series with the unidirectional transmission device 104; when the controllable clutch 1001 closes up, either the transmission direction is executed in flexible transmission between the first input/output end 101 and the second input/output end 102 while in the other direction, the rigid transmission; when the controllable clutch 1001 is disengaged, the unidirectional transmission device 104 is not functioning, and the transmission between the first input/output end 101 and the second input/output end 102 is characterized by a bidirectional flexible transmission; and Another controllable clutch 1002: related to an optional item provided between the active revolution part 1031 and the passive revolution part 1032 of the flexible coupling device 103; when the controllable clutch 1002 is disengaged, an existing flexible transmission relation is maintained between the active revolution part 1031 and the passive revolution part 1032; however, once the controllable clutch 1002 is closed up, the rigid transmission function is executed between the active revolution part 1031 and the passive revolution part 1032.

Figure 15:
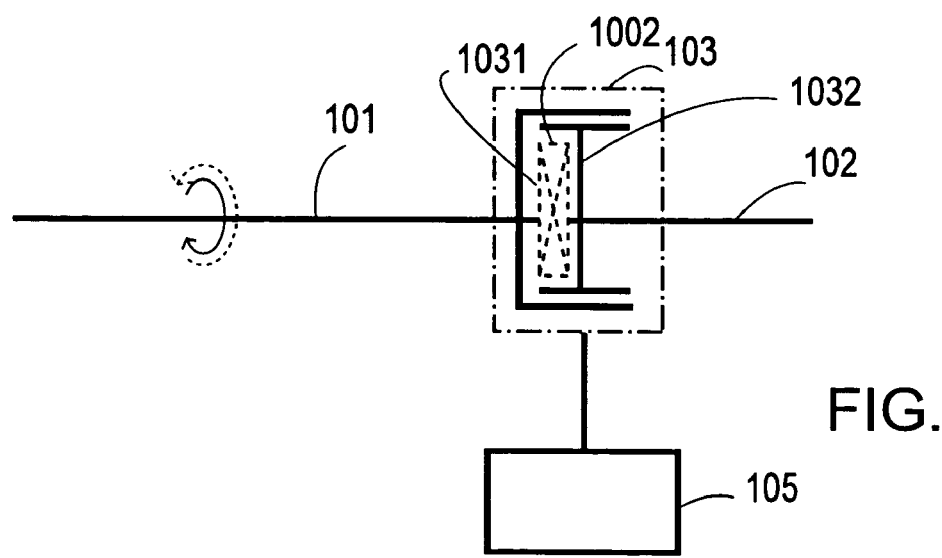
FIG. 15 is a schematic view showing that the preferred embodiment illustrated in FIG. 2 is further provided with the controllable clutch at where between the active and the passive revolution parts of the flexible coupling device.

FIG. 15 is a schematic view showing that the preferred embodiment illustrated in FIG. 2 is further provided with the controllable clutch at where between the active and the passive revolution parts of the flexible coupling device. With the absence of the unidirectional transmission device 104 between the active and the passive revolution parts of the is flexible coupling device as illustrated in FIG. 2, the preferred embodiment is essentially comprised of:

The controllable clutch 1002: related to an optional item provided between the active revolution part 1031 and the passive revolution part 1032 of the flexible coupling device 103; when the controllable clutch 1002 is disengaged, an existing flexible transmission relation is maintained between the active revolution part 1031 and the passive revolution part 1032; however, once the controllable clutch 1002 is closed up, the rigid transmission function is executed between the active revolution part 1031 and the passive revolution part 1032.

Figure 16:
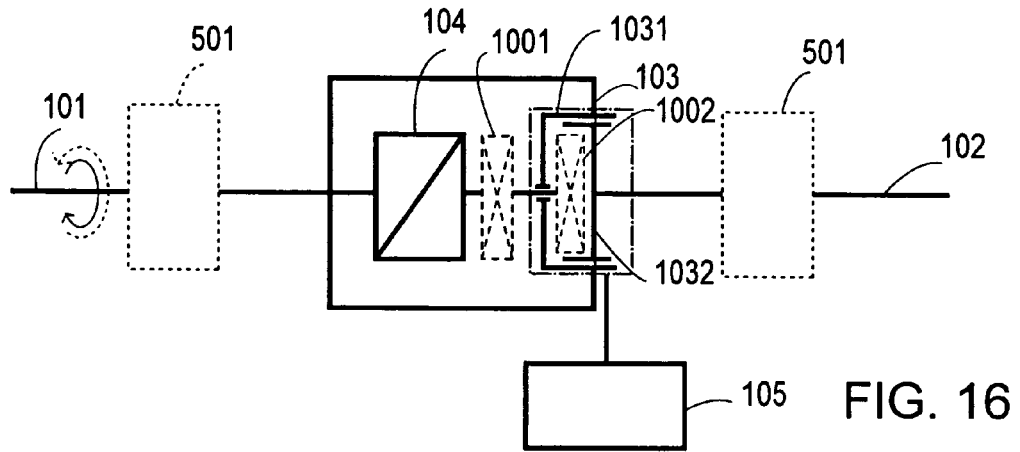
FIG. 16 is a schematic view showing that the preferred embodiment illustrated in FIG. 11 is further provided in series the controllable clutch to the unidirectional transmission device, or at where between the active and the passive revolution parts of the flexible coupling device.

FIG. 16 is a schematic view showing that the preferred embodiment illustrated in FIG. 11 is further provided in series the controllable clutch to the unidirectional transmission device, or at where between the active and the passive revolution parts of the flexible coupling device. Additional to the unidirectional transmission device 104 provided in series between the active and the passive revolution parts of the flexible coupling device as illustrated in FIG. 11, the preferred embodiment is essentially comprised of:

The controllable clutch 1001: related to an optional item provided in series with the unidirectional transmission device 104; when the controllable clutch 1001 closes up, either the transmission direction is executed in flexible transmission between the first input/output end 101 and the second input/output end 102 while in the other direction, the rigid transmission; when the controllable clutch 1001 is disengaged, the unidirectional transmission device 104 is not functioning, and the transmission between the first input/output end 101 and the second input/output end 102 is characterized by a bidirectional flexible transmission;

The controllable clutch 1002: related to an optional item provided between the active revolution part 1031 and the passive revolution part 1032 of the flexible coupling device 103; when the controllable clutch 1002 is disengaged, an existing flexible transmission relation is maintained between the active revolution part 1031 and the passive revolution part 1032; however, once the controllable clutch 1002 is closed up, the rigid transmission function is executed between the active revolution part 1031 and the passive revolution part 1032; and The controllable clutch 501: related to an optional item that can be controlled by manual, mechanical, electromagnetic force or flow velocity to close up the transmission and disengaging from the transmission for further control of the external transmission executed by the first input/output end 101, or control of the external transmission executed by the second input/output end 102; the controllable clutch 501 may be provided at either or both of the first input/output end 101 and the second input/output end 102 according to the operation requirements.

Figure 17:
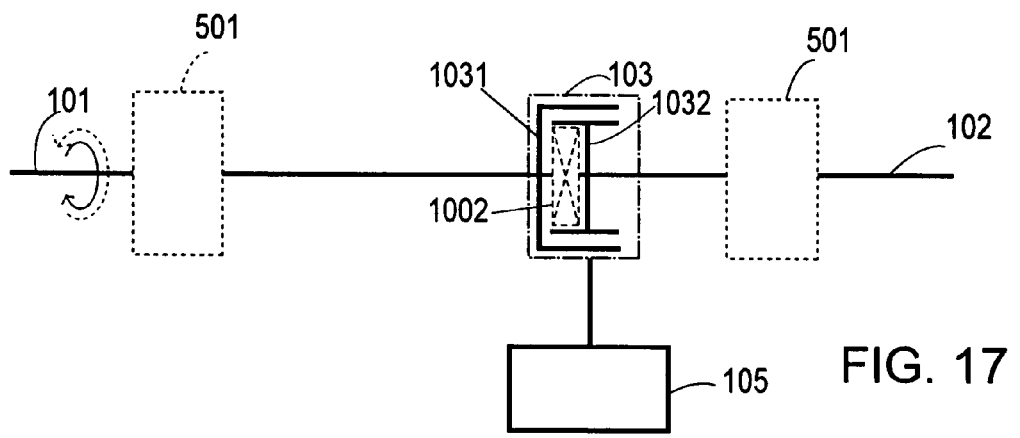
FIG. 17 is a schematic view showing that the preferred embodiment illustrated in FIG. 12 is further provided with the controllable clutch at where between the active and the passive revolution parts of the flexible coupling device.

FIG. 17 is a schematic view showing that the preferred embodiment illustrated in FIG. 12 is further provided with the controllable clutch at where between the active and the passive revolution parts of the flexible coupling device. With the absence of the unidirectional transmission device 104 between the active and the passive revolution parts of the flexible coupling device as illustrated in FIG. 12, the preferred embodiment is essentially comprised of:

The controllable clutch 1002: related to an optional item provided between the active revolution part 1031 and the passive revolution part 1032 of the flexible coupling device 103; when the controllable clutch 1002 is disengaged, an existing flexible transmission relation is maintained between the active revolution part 1031 and the passive revolution part 1032; however, once the controllable clutch 1002 is closed up, the rigid transmission function is executed between the active revolution part 1031 and the passive revolution part 1032; and The controllable clutch 501: related to an optional item that can be controlled by manual, mechanical, electromagnetic force or flow velocity to close up the transmission and disengaging from the transmission for further control of the external transmission executed by the first input/output end 101, or control of the external transmission executed by the second input/output end 102; the controllable clutch 501 may be provided at either or both of the first input/output end 101 and the second input/output end 102 according to the operation requirements.

Figure 18:
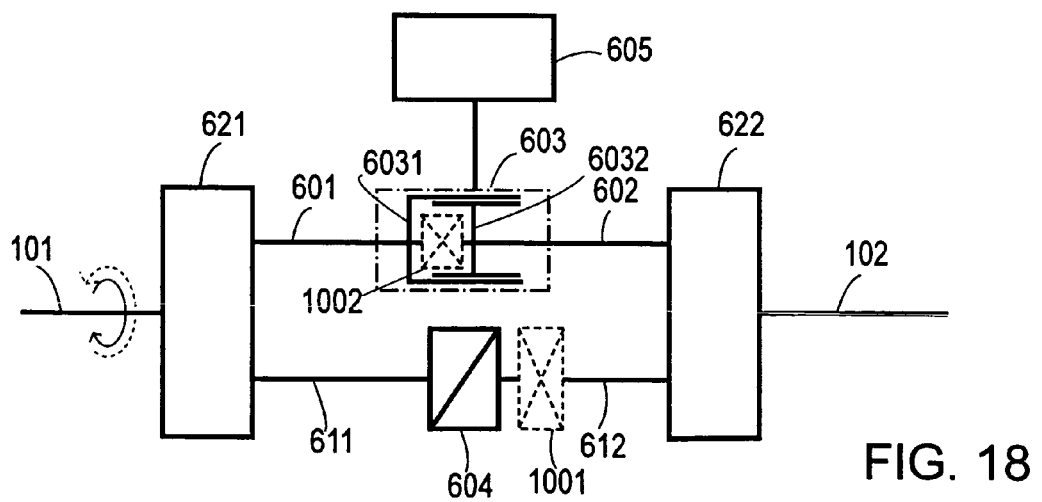
FIG. 18 is a schematic view showing that the preferred embodiment illustrated in FIG. 13 is further provided in series the controllable clutch to the unidirectional transmission device, or at where between the active and the passive revolution parts of the flexible coupling device.

FIG. 18 is a schematic view showing that the preferred embodiment illustrated in FIG. 13 is further provided in series the controllable clutch to the unidirectional transmission device, or at where between the active and the passive revolution parts of the flexible coupling device. Additional to the structure as illustrated in FIG. 13, the preferred embodiment is essentially comprised of:

One or multiple flexible coupling device 603: including a first input/output end 601 and a second input/output end 602, and one or multiple unidirectional transmission device 604 including a selected first input/output end 611 and a selected second input/output end 612. A transmission device 621 comprised of a transmission gear set of the prior art is disposed between the first input/output end 601 of the flexible coupling device 603 and the first input/output end 611 of the unidirectional transmission device 604 to couple the revolution power source, the first input/output end 601, and the first input/output end 611 for all them to execute mutual transmission among one another; another transmission device 622 comprised of a transmission gear set of the prior art is disposed between the second input/output end 602 of the flexible coupling device 603 and the second input/out end 612 of the unidirectional transmission device 604 to couple a load, the second input/output end 602 and the second input/output end 612 for them to execute mutual transmission among one another;

The controllable clutch 1001: related to an optional item provided in series with the unidirectional transmission device 604; when the controllable clutch 1001 closes up, either the transmission direction is executed in flexible transmission between the first input/output end 611 and the second input/output end 612 while in the other direction, the rigid transmission; when the controllable clutch 1001 is disengaged, the unidirectional transmission device 604 is not functioning; and The controllable clutch 1002: related to an optional item provided between the active revolution part 6031 and the passive revolution part 6032 of the flexible coupling device 603; when the controllable clutch 1002 is disengaged, an existing flexible transmission relation is maintained between the active revolution part 6031 and the passive revolution part 6032; however, once the controllable clutch 1002 is closed up, the rigid transmission function is executed between the active revolution part 6031 and the passive revolution part 6032.

All those preferred embodiments of the present invention described above show the examples of the combination of series, parallel or series-parallel power transmission within the teaching of the innovative characteristics of the bidirectional coupling device with variable transmission characteristics of the present invention. Depending on the operation requirements, other applied combinations can be selected.

Figure 19:
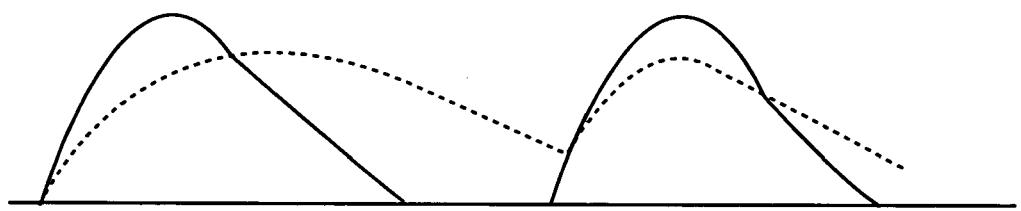
FIG. 19 is a schematic view showing that the operation of the transmission of the coupling device of the present invention is characterized by having a rigid coupling in one direction of transmission, and a flexible coupling in another direction of transmission with both couplings respectively coupled to a revolution power source and to an inertia flywheel.

The flywheel driven directly or through a transmission device of the prior art by the bidirectional coupling device with variable transmission characteristics is capable of directly or by means of a transmission device to couple the drive serving as an inertia flywheel for energy storage and release or as a damper flywheel with its applications described as follows:

(A) When the flywheel is coupled to the coupling device of the present invention to function as an inertia flywheel for energy storage and release, the flywheel functioning as the inertia flywheel for energy storage and release is directly or by means of a transmission device comprised of a transmission device of the prior art coupled to the bidirectional coupling device with variable transmission characteristics. If one direction of transmission of the coupling device relates to a rigid coupling and another direction, to a flexible coupling and once the speed of the revolution power source changes, the operation status is as illustrated in FIG. 19, wherein, the operation of the transmission of the coupling device of the present invention is characterized by having a rigid coupling in one direction of transmission, and a flexible coupling in another direction of transmission with both couplings respectively coupled to a revolution power source and to the inertia flywheel. In FIG. 19, the solid line represents the curve of the speed of the revolution power source and the dotted line, that of the inertia flywheel. The revolution power source and the energy storage and release by the inertia flywheel function as follows:

If the transmission of kinetics from the first input/output end to the second input/output end indicates a flexible coupling, that from the second input/output end to the first input/output end indicates a rigid transmission, the first input/output end is coupled to the revolution power source, and the second input/output end is directly or by means of a transmission device coupled to the inertia flywheel, the increase rate of the inertia flywheel is slower than that of the first input/output end due to the effect of flexible coupling once the revolution kinetics is inputted into the first input/out end to start the acceleration, and when the first input/output end starts to decelerate, the relation of changing in speed between the inertia flywheel and the first input/output end indicates synchronous deceleration due to the transmission of the unidirectional transmission device.

Figure 20:
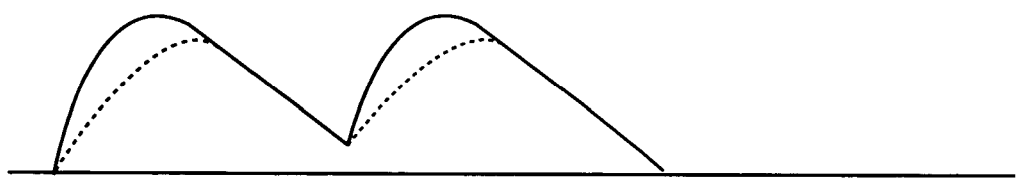
FIG. 20 is a schematic view showing that when the bidirectional transmission of the coupling device of the present invention is characterized by flexible coupling, one input/output end of the coupling device is coupled to the revolution power source while another input/output end is coupled to the inertia flywheel.

When the bidirectional coupling device with variable transmission characteristics directly or by means of a transmission gear set of the prior art coupled to the flexible coupling device of the inertia flywheel indicates bidirectional transmission and the transmission in both directions indicate the same flexible coupling, then the bidirectional coupling is comprised of the same flexible coupling device characterized by having the same or different specific flexibility or torque value or the controllable flexibility or torque value, or is comprised by two flexible coupling devices having the same or different coupling characteristics. Accordingly, once the revolution power source executes valuable operation, its operation status shows that both directions of transmission of the coupling device of the present invention indicate the same flexible coupling characteristics as illustrated in FIG. 20; wherein, when the bidirectional transmission of the coupling device of the present invention is characterized by flexible coupling, one input/output end of the coupling device is coupled to the revolution power source while another input/output end is coupled to the inertia flywheel. In FIG. 20, the solid line represents the curve of the speed of the revolution power source and the dotted line, that of the inertia flywheel. The revolution power source and the energy storage and release functions of the flywheel coupled to and interacting with the revolution power source are described as follows:

If the first and the second input/output ends of the flexible coupling device indicates the same flexible coupling in both directions, the first input/output end is coupled to the revolution power source, and the second input/output end is coupled to the inertia flywheel, then when the revolution kinetics is inputted into the first input/output end to start the acceleration, the increase rate of the speed of the inertia flywheel is slower than that of the first input/output end due to the flexible coupling; and when the first input/output end is decelerating, the deceleration rate of the inertia flywheel is still slower than that of the first input/out end due to the flexible coupling.

Figure 21:
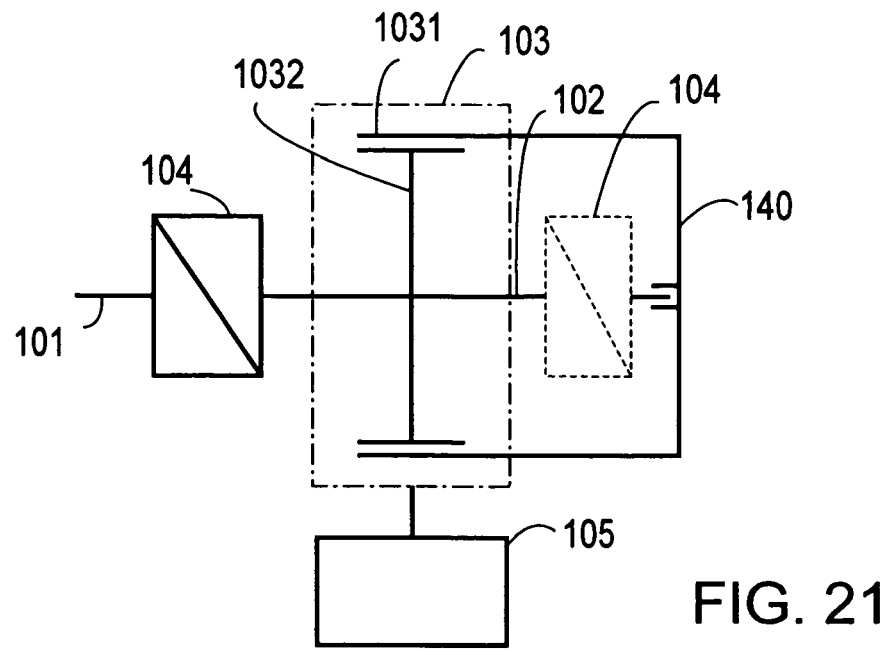
FIG. 21 is a schematic view showing that another preferred embodiment of the present invention has its first input/output end of the flexible coupling device provided in series the unidirectional transmission device to drive the inertia flywheel.

FIG. 21 is a schematic view showing that another preferred embodiment of the present invention has its first input/output end of the flexible coupling device provided in series the unidirectional transmission device to drive the inertia flywheel. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Unidirectional transmission device 104: related to one that is comprised of a unidirectional clutch or any other transmission device of the prior art that is capable of executing unidirectional transmission while idling in the opposite direction;

Flexibility or torque value control device 105: related to an optional item provided for controlling the flexible coupling device 103; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and The inertia flywheel 140: including the inherited inertia effects of the flywheel provided for the storage or release of the revolution kinetics.

The unidirectional transmission device 104 is disposed at the first input/output end 101 of the flexible coupling device 103, or at where between the active revolution part 1031 and the passive revolution part 1032. The inertia flywheel 140 is directly driven by the passive revolution part 1032 of the flexible coupling device 103 in a direction from the first input/output end 101, the unidirectional transmission device 104 and the flexible coupling device 103 to drive the inertial flywheel 140 in a fashion of flexible drive while the inertia flywheel 140 is not provided with the function of executing the feedback transmission in opposite direction.

Each of all key components including the flexible coupling device 103, the unidirectional transmission device 104, and the inertia flywheel 140 can be made standing-alone or sharing the same structure between two or among multiple components.

Figure 22:
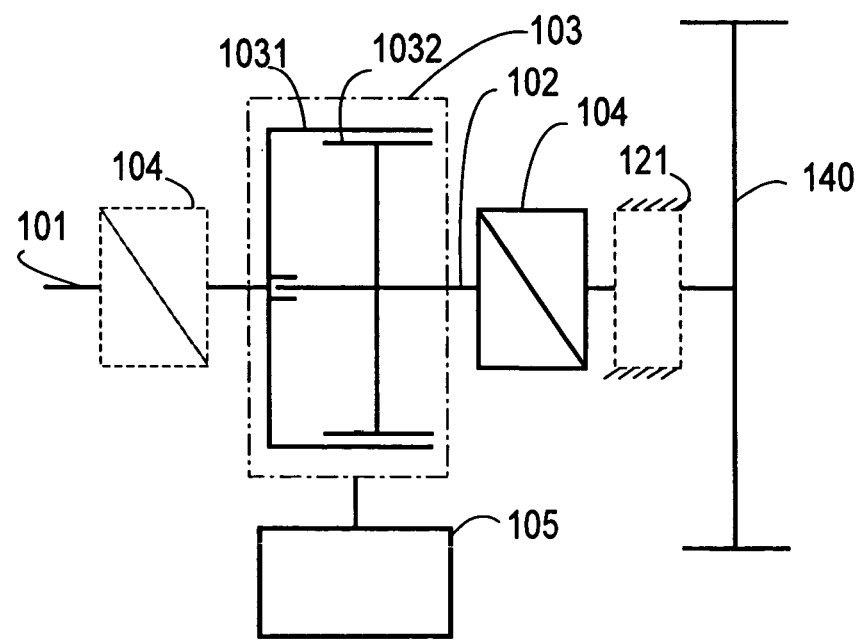
FIG. 22 is a schematic view showing that another preferred embodiment yet of the present invention is provided in series at where between the second input/output end and a damper flywheel of the flexible coupling device with the unidirectional transmission device to drive the inertia flywheel.

FIG. 22 is a schematic view showing that another preferred embodiment yet of the present invention is provided in series at where between the second input/output end and a damper flywheel of the flexible coupling device with the unidirectional transmission device to drive the inertia flywheel. The preferred embodiment of the present invention is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Unidirectional transmission device 104: related to one that is comprised of a unidirectional clutch or any other transmission device of the prior art that is capable of executing unidirectional transmission while idling in the opposite direction;

Flexibility or torque value control device 105: related to an optional item provided for controlling the flexible coupling device 103; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and The inertia flywheel 140: including the inherited inertia effects of the flywheel provided for the storage or release of the revolution kinetics.

The unidirectional transmission device 104 is disposed at where between the second input/output end 102 of the flexible coupling device 103 and the inertia flywheel 140, and the inertia flywheel 140 is directly driven by the output end of the unidirectional transmission device 104 or by means of a transmission device 121 comprised of a transmission gear set of the prior art in a direction from the first input/output end 101, the flexible coupling device 103 and the unidirectional transmission device 104 to drive the inertial flywheel 140 in a fashion of flexible drive while the inertia flywheel 140 is not provided with the function of executing the feedback transmission in opposite direction. Depending on the operation requirements, the unidirectional transmission device 104 may be disposed in series with the first input/output end 101.

Each of all key components including the flexible coupling device 103, the unidirectional transmission device 104, and the inertia flywheel 140 can be made standing-alone or snaring the same stricture between two or among multiple components.

Figure 23:
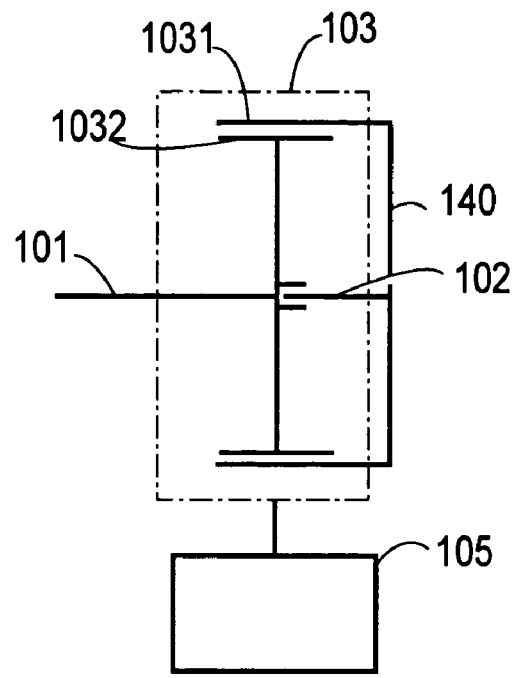
FIG. 23 is a schematic view showing that the inertia flywheel in another preferred embodiment yet of the present invention has an inertia flywheel driven by the first input/output end of the flexible coupling device.

FIG. 23 is a schematic view showing that the inertia flywheel in another preferred embodiment yet of the present invention has an inertia flywheel driven by the first input/output end of the flexible coupling device. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both is (1) and (2) for the transmission flexibility or torque value of both ends to be the same or different; and The inertia flywheel 140: including the inherited inertia effects of the flywheel provided for the storage or release of the revolution kinetics.

The inertia flywheel 140 is directly driven by the passive revolution part 1032 of the flexible coupling device 103 in the direction from the first input/output end 101 to drive the inertia flywheel 140 in the fashion of flexible drive by the flexible coupling device 103, and the inertia flywheel 140 provides the function of flexible feedback transmission in opposite direction.

Each of all key components including the flexible coupling device 103, and the inertia flywheel 140 can be made standing-alone or sharing the same structure between two or among multiple components.

Figure 24:
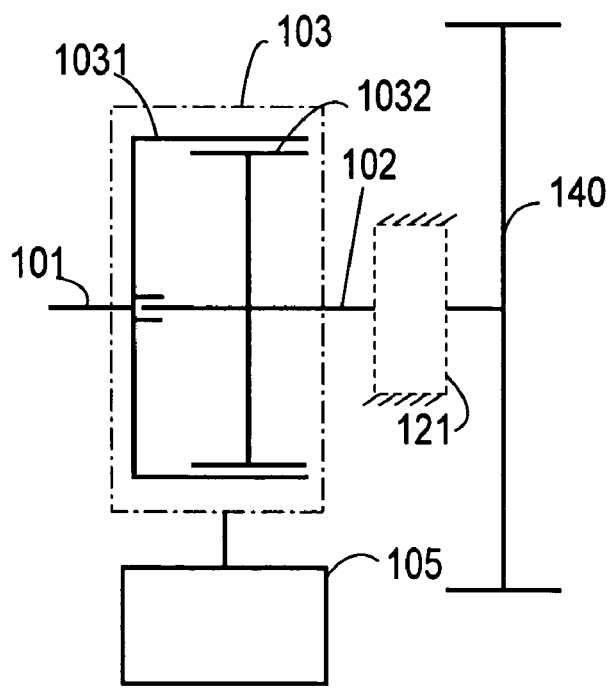
FIG. 24 is a schematic view showing that the inertia flywheel in another preferred embodiment yet of the present invention has an inertia flywheel driven by the second input/output end of the flexible coupling device.

FIG. 24 is a schematic view showing that the inertia flywheel in flywheel driven by the second input/output end of the flexible coupling device. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and The inertia flywheel 140: including the inherited inertia effects of the flywheel provided for the storage or release of the revolution kinetics.

The damper flywheel 120 is directly driven by the second input/output end 102 of the flexible coupling device 103 or by a transmission device 121 comprised of a transmission gear set of the prior art in the direction from the first input/output end 101, the flexible coupling device 103 and the flexible driven inertia flywheel 140, and the inertia flywheel 140 provides the function of flexible feedback transmission in opposite direction.

Each of all key components including the flexible coupling device 103, and the inertia flywheel 140 can be made standing-alone or sharing the same structure between two or among multiple components.

(B) If the flywheel relates to a damper flywheel, the damper flywheel can be comprised of a flywheel with its inherited damper effects, or the flywheel incorporated with a damper device of damper effects, or the flywheel incorporated with a damper load. Damper effects include (1) friction type damper flywheel providing friction type damper effects, or mechanical load damper effects, or (2) non-contact type damper flywheel comprised of non-contact type damper effects of inverse torque damper providing eddy effects damper, gas or liquid type flow velocity damper, viscous type damper of magnetic flow or powder, or generator effects, or comprised of other damper effects structure of the prior art. The damper flywheel is directly coupled to or by means of a transmission device comprised of a transmission gear set of the prior to the flexible coupling device. The first input/output end of the flexible coupling device is coupled to a revolution mechanism of the prior art or to the revolution part of an electric motor, an internal or external combustion engine, a wind or liquid flow velocity actuated structure or a manually driven structure, or may be driven by revolution kinetics generated from a device driven by physical, chemical or natural energy source such as electric energy, optical energy, thermal energy, manual, or fluid including wind, hydraulic and tidal energies. The applied structure is described in the following preferred embodiments of the present invention.

Figure 25:
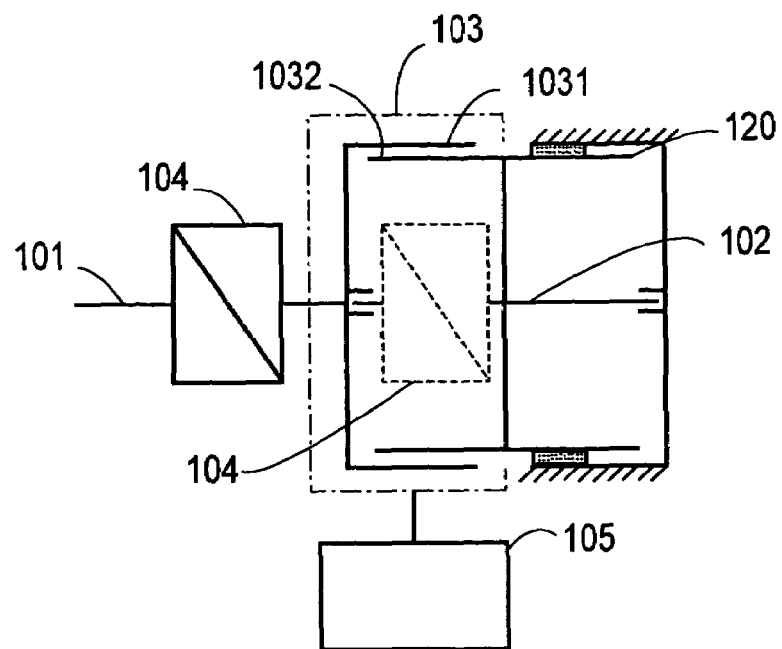
FIG. 25 is a schematic view showing that the first input/out end of the flexible coupling device in another preferred embodiment yet of the present invention is provided with a unidirectional transmission device to drive a damper flywheel of friction type.

FIG. 25 is a schematic view showing that the first input/out end of the flexible coupling device in another preferred embodiment yet of the present invention is provided with a unidirectional transmission device to drive a damper flywheel of friction type. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Unidirectional transmission device 104: related to one that is comprised of a unidirectional clutch or any other transmission device of the prior art that is capable of executing unidirectional transmission while idling in the opposite direction;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and The friction type damper flywheel 120: comprised of a flywheel with its inherited damper effects, or a flywheel incorporated with a damper device of damper effects, or a flywheel incorporated with a mechanical damper load, or of a structure of other friction type damper effects of the prior art.

The unidirectional transmission device 104 is disposed in series with the first input/output end 101 of the flexible coupling device 103, or at where between the active revolution part 1031 and the passive revolution part 1032 of the flexible transmission device 103, and the friction type damper flywheel 120 is directly driven by the passive revolution part 1032 of the flexible coupling device 103 in the direction from the first input/output end 101, the unidirectional transmission device 104 and the flexible coupling device 103 to drive the friction type damper flywheel 120 in the fashion of flexible drive. Wherein, the friction type damper flywheel 120 is not provided with the function of inertia feedback of transmission in the opposite direction.

Each of all key components including the flexible coupling device 103, the unidirectional transmission device 104, and the friction type damper flywheel 120 can be made standing-alone or sharing the same structure between two or among multiple components.

Figure 26:
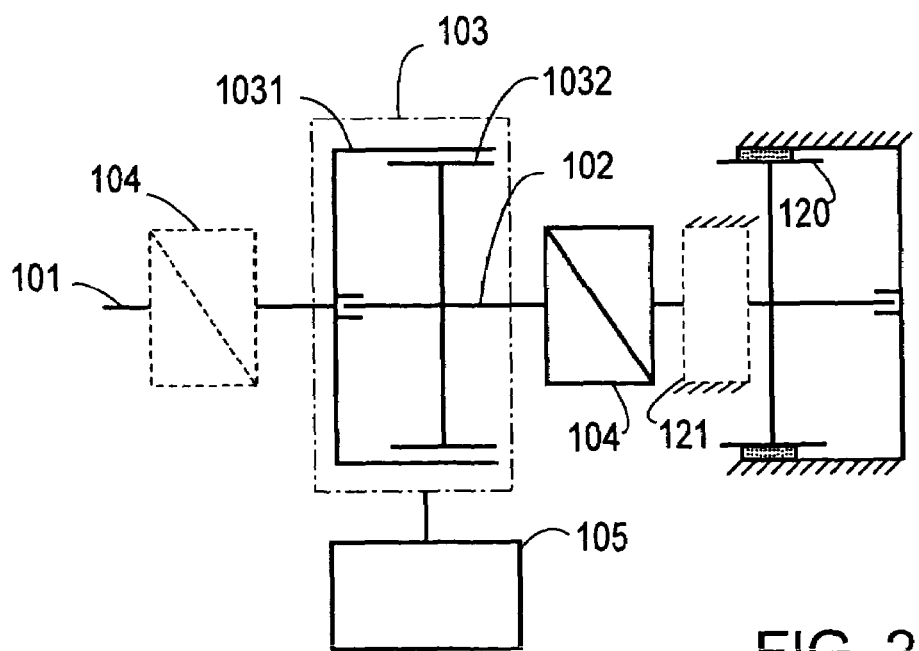
FIG. 26 is a schematic view showing that another preferred embodiment yet of the present invention is provided in series with the unidirectional transmission device at where between the second input/output end and the damper flywheel of the flexible coupling device to drive the damper flywheel of friction type.

FIG. 26 is a schematic view showing that another preferred embodiment yet of the present invention is provided in series with the unidirectional transmission device at where between the second input/output end and the damper flywheel of the flexible coupling device to drive the damper flywheel of friction type. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Unidirectional transmission device 104: related to one that is comprised of a unidirectional clutch or any other transmission device of the prior art that is capable of executing unidirectional transmission while idling in the opposite direction;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and The friction type damper flywheel 120: comprised of a flywheel with its inherited damper effects, or a flywheel incorporated with a damper device of damper effects, or a flywheel incorporated with a mechanical damper load, or of a structure of other friction type damper effects of the prior art.

The unidirectional transmission device 104 is disposed at where between the second input/output end 102 of the flexible coupling device 103 and the friction type damper flywheel 120, and the friction type damper flywheel 120 is directly driven or through a transmission device 121 comprised of a transmission gear set of the prior art by the output end of the unidirectional transmission device 104 in the direction from the first input/output end 101, the flexible coupling device 103, and the unidirectional transmission device 104 to drive the friction type damper flywheel 120 in the fashion of flexible drive. Wherein, the friction type damper flywheel 120 is not provided with the function of inertia feedback of transmission in the opposite direction. Depending on the operation requirements, the unidirectional transmission device may be provided in series with the first input/output end 101.

Each of all key components including the flexible coupling device 103, the unidirectional transmission device 104, and the friction type damper flywheel 120 can be made standing-alone or sharing the same structure between two or among multiple components.

Figure 27:
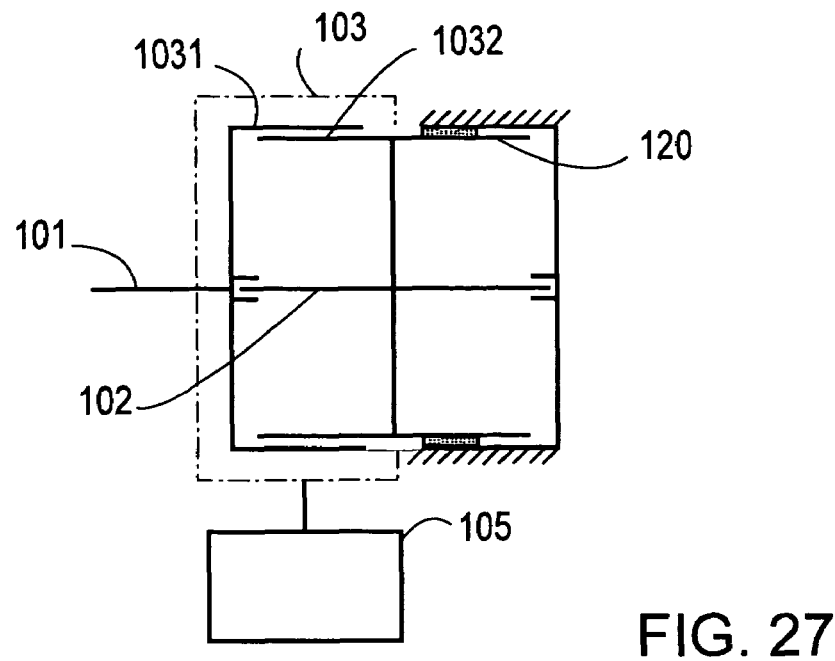
FIG. 27 is schematic view of another preferred embodiment yet of the present invention showing that the second input/output end of the flexible coupling device drives the damper flywheel of friction type.

FIG. 27 is schematic view of another preferred embodiment yet of the present invention showing that the second input/output end of the flexible coupling device drives the damper flywheel of friction type. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and The friction type damper flywheel 120: comprised of a flywheel with its inherited damper effects, or a flywheel incorporated with a damper device of damper effects, or a flywheel incorporated with a mechanical damper load, or of a structure of other friction type damper effects of the prior art.

The friction type damper flywheel 120 is directly driven by the passive revolution part 1032 of the flexible coupling device 103 in the direction from the first input/output end 101 through the flexible coupling device 103 to drive the friction type damper flywheel 120 in the fashion of flexible drive. Wherein, the friction type damper flywheel 120 is provided with the function of flexible feedback of transmission in the opposite direction.

Each of all key components including the flexible coupling device 103 and the friction type damper flywheel 120 can be made standing-alone or sharing the same structure between two or among multiple components.

Figure 28:
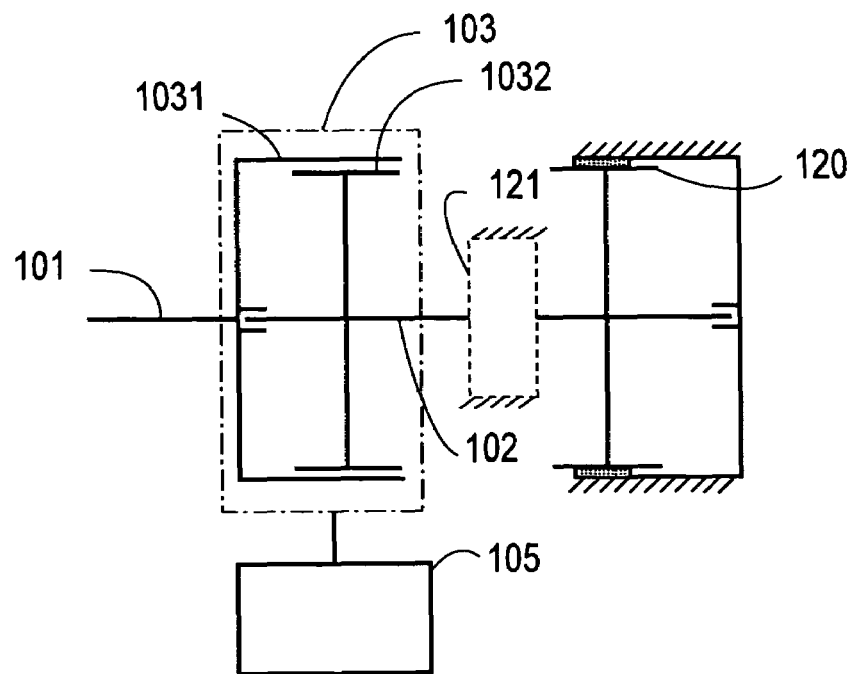
FIG. 28 is a schematic view of another preferred embodiment yet of the present invention showing that the second input/output end of the flexible coupling device drives the damper flywheel.

FIG. 28 is a schematic view of another preferred embodiment yet of the present invention showing that the second input/output end of the flexible coupling device drives the damper flywheel. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and The friction type damper flywheel 120: comprised of a flywheel with its inherited damper effects, or a flywheel incorporated with a damper device of damper effects, or a flywheel incorporated with a mechanical damper load, or of a structure of other friction type damper effects of the prior art.

The friction type damper flywheel 120 is directly drive by the second input/output end 102 of the flexible coupling device 103 or by the transmission device 121 comprised of a transmission gear set of the prior art in the direction from the first input/output end 101 through and the flexible coupling device 103 to drive the friction type damper flywheel 120 in the fashion of flexible drive. Wherein, the friction type damper flywheel 120 is provided with the function of flexible feedback of transmission in the opposite direction.

Each of all key components including the flexible coupling device 103 and the friction type damper flywheel 120 can be made standing-alone or sharing the same structure between two or among multiple components.

Figure 29:
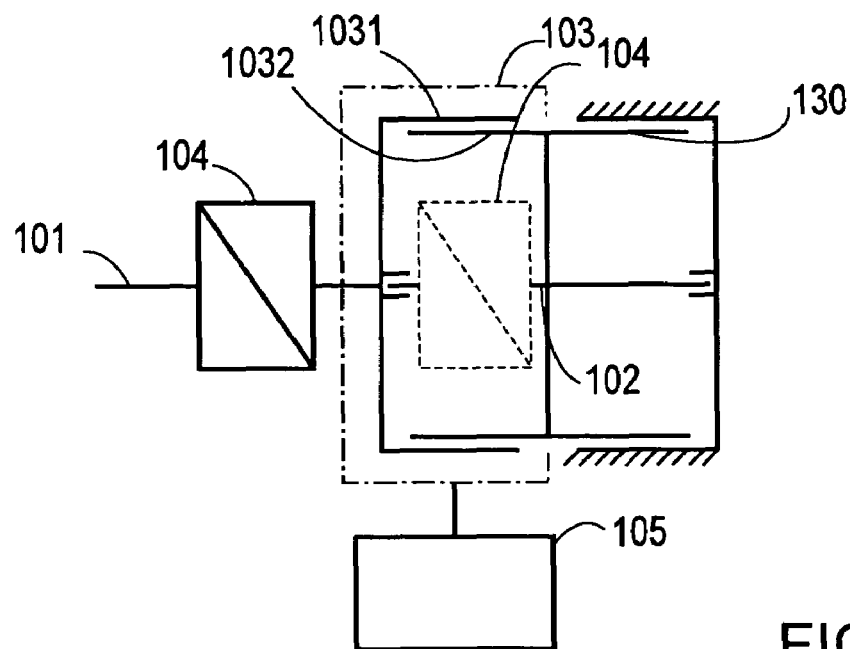
FIG. 29 is a schematic view showing that the first input/out end of the flexible coupling device in another preferred embodiment yet of the present invention is provided with a unidirectional transmission device to drive a damper flywheel of non-contact type.

FIG. 29 is a schematic view showing that the first input/out end of the flexible coupling device in another preferred embodiment yet of the present invention is provided with a unidirectional transmission device to drive a damper flywheel of non-contact type. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Unidirectional transmission device 104: related to one that is comprised of a unidirectional clutch or any other transmission device of the prior art that is capable of executing unidirectional transmission while idling in the opposite direction;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and A non-contact type damper flywheel 130: comprised of a flywheel with its inherited non-contact type damper effects, or a flywheel incorporated with a damper device of non-contact type damper effects, or a flywheel incorporated with a mechanical damper load; and the non-contact type damper effects include a structure comprised of non-contact type damper effects of inverse torque damper providing eddy effects damper, gas or liquid type flow velocity damper, viscous type damper of magnetic flow or powder, or generator effects, or comprised of other damper effects structure of the prior art.

The unidirectional transmission device 104 is disposed at the first input/output end 101 of the flexible coupling device 103, or at where between the active revolution part 1031 and the passive revolution part 1032 of the flexible transmission device 103, and the non-contact type damper flywheel 130 is directly driven by the passive revolution part 1032 of the flexible coupling device 103 in the direction from the first input/output end 101, the unidirectional transmission device 104 and the flexible coupling device 103 to drive the non-contact type damper flywheel 130 in the fashion of flexible drive. Wherein, the non-contact type damper flywheel 130 is not provided with the function of inertia feedback of transmission in the opposite direction.

Each of all key components including the flexible coupling device 103, the unidirectional transmission device 104, and the non-contact type damper flywheel 130 can be made standing-alone or sharing the same structure between two or among multiple components.

Figure 30:
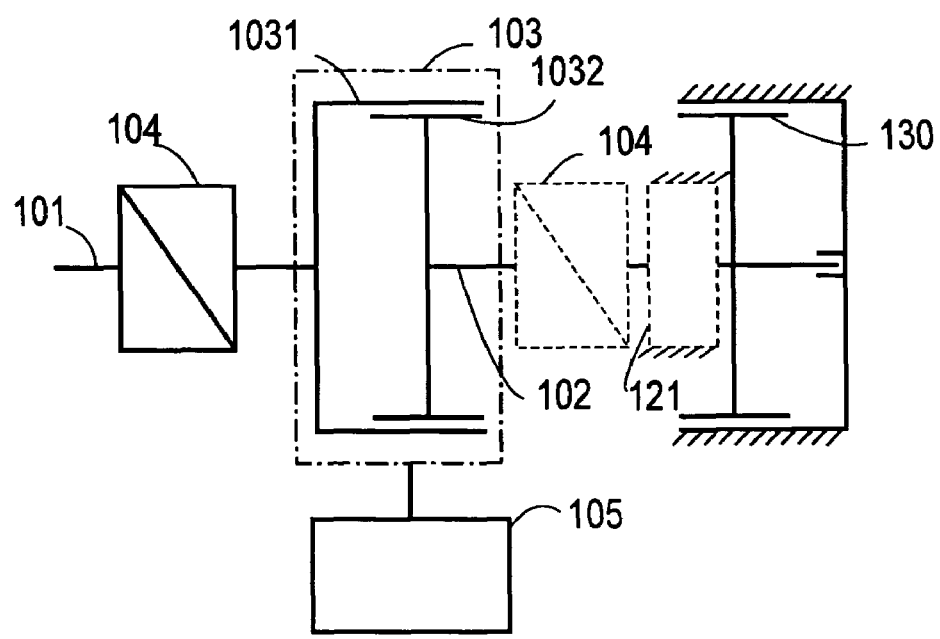
FIG. 30 is a schematic view showing that another preferred embodiment yet of the present invention is provided in series with the unidirectional transmission device at where between the second input/output end and the damper flywheel of the flexible coupling device to drive the damper flywheel of non-contact type.

FIG. 30 is a schematic view showing that another preferred embodiment yet of the present invention is provided in series with the unidirectional transmission device at where between the second input/output end and the damper flywheel of the flexible coupling device to drive the damper flywheel of non-contact type. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Unidirectional transmission device 104: related to one that is comprised of a unidirectional clutch or any other transmission device of the prior art that is capable of executing unidirectional transmission while idling in the opposite direction;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and A non-contact type damper flywheel 130: comprised of a flywheel with its inherited non-contact type damper effects, or a flywheel incorporated with a damper device of non-contact type damper effects, or a flywheel incorporated with a mechanical damper load; and the non-contact type damper effects include a structure comprised of non-contact type damper effects of inverse torque damper providing eddy effects damper, gas or liquid type flow velocity damper, viscous type damper of magnetic flow or powder, or generator effects, or comprised of other damper effects structure of the prior art.

The unidirectional transmission device 104 is disposed at where between the second input/output end 102 of the flexible coupling device 103 and the non-contact type damper flywheel 130, and the non-contact type damper flywheel 130 is directly driven from the output end of the unidirectional transmission device 104 or through the transmission device 121 comprised of a transmission gear set of the prior art in the direction from the first input/output end 101, the flexible coupling device 103, and the unidirectional transmission device 104 to drive the non-contact type damper flywheel 130 in the fashion of flexible drive. Wherein, the non-contact type damper flywheel 130 is not provided with the function of inertia feedback of transmission in the opposite direction. Depending on the operation requirements, the unidirectional transmission device 104 may be provided in series with the first input/output end 101.

Each of all key components including the flexible coupling device 103, the unidirectional transmission device 104, and the non-contact type damper flywheel 130 can be made standing-alone or sharing the same structure between two or among multiple components.

Figure 31:
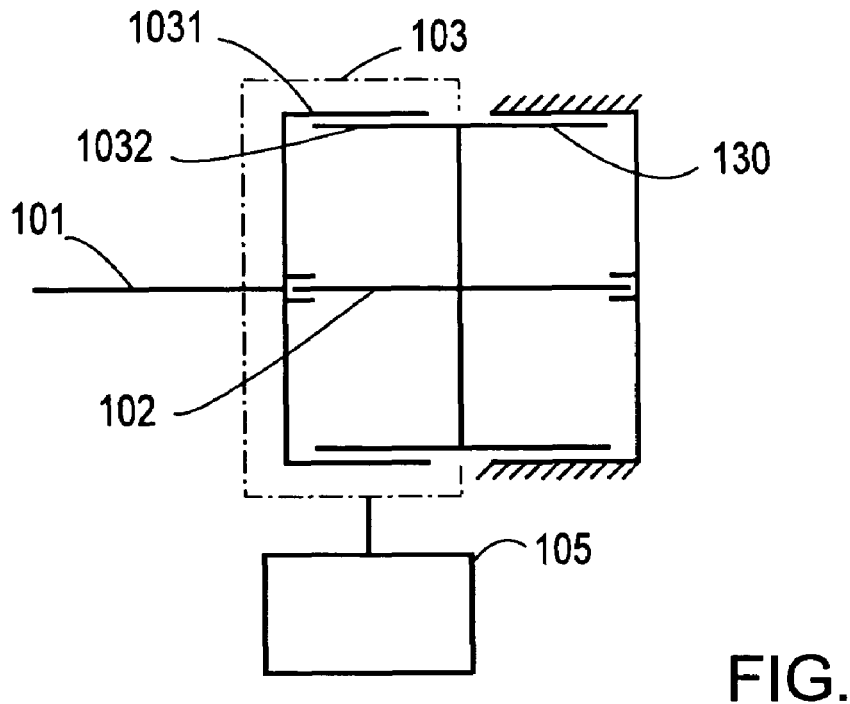
FIG. 31 is a schematic view of another preferred embodiment of the present invention showing that the first input/output end of the flexible coupling device drives the damper flywheel of non-contact type.

FIG. 31 is a schematic view of another preferred embodiment of the present invention showing that the first input/output end of the flexible coupling device drives the damper flywheel of non-contact type. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and A non-contact type damper flywheel 130: comprised of a flywheel with its inherited non-contact type damper effects, or a flywheel incorporated with a damper device of non-contact type damper effects, or a flywheel incorporated with a mechanical damper load; and the non-contact type damper effects include a structure comprised of non-contact type damper effects of inverse torque damper providing eddy effects damper, gas or liquid type flow velocity damper, viscous type damper of magnetic flow or powder, or generator effects, or comprised of other damper effects structure of the prior art.

The non-contact type damper flywheel 130 is directly driven by the passive revolution part 1032 of the flexible coupling device 103 in the direction from the first input/output end 101, the flexible coupling device 103 to drive the non-contact type damper flywheel 130 in the fashion of flexible drive. Wherein, the non-contact type damper flywheel 130 is provided with the function of inertia feedback of transmission in the opposite direction.

Each of all key components including the flexible coupling device 103 and the non-contact type damper flywheel 130 can be made standing-alone or sharing the same structure between two or among multiple components.

Figure 32:
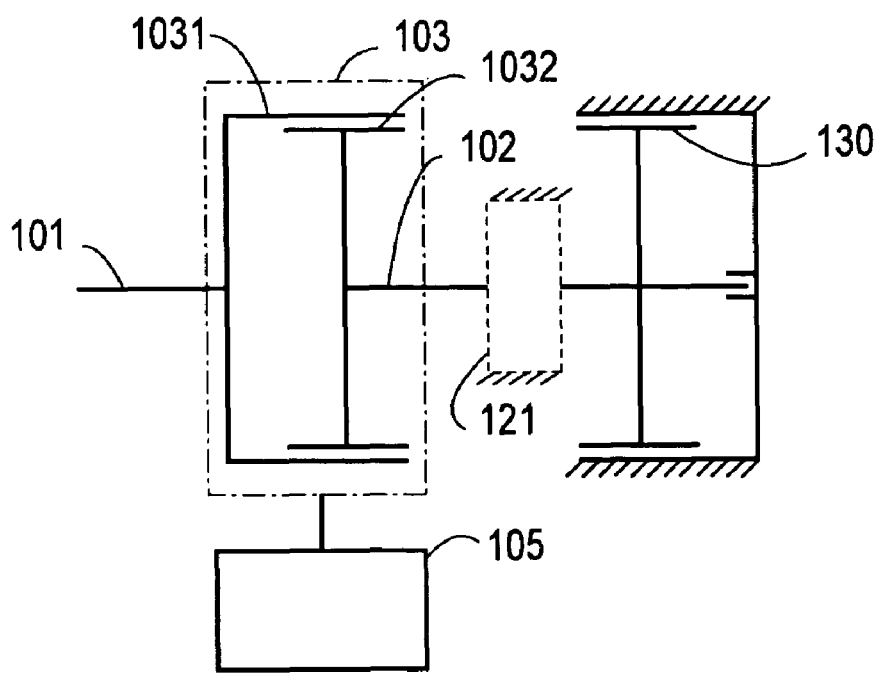
FIG. 32 is a schematic view of another preferred embodiment of the present invention showing that the second input/output end of the flexible coupling device drives the damper flywheel of non-contact type.

FIG. 32 is a schematic view of another preferred embodiment of the present invention showing that the second input/output end of the flexible coupling device drives the damper flywheel of non-contact type. The preferred embodiment is essentially comprised of:

The flexible coupling device 103: related to a flexible transmission device provided with a mechanism of specific or controllable flexibility or torque value made of a mechanical slide friction coupler, viscous fluid slide friction coupler, eddy coupler, magnetic fluid or magnetic powder coupler, gas or liquid fluid coupler, or dual-acting generation effect coupler of mechanical, electromagnetic or other physical structure of the prior art, or any other coupler of the similar function; it contains an active revolution part 1031 and a passive revolution part 1032 with both providing the non-rigid coupling transmission of revolution kinetics of continuous revolution difference; the active revolution part 1031 is coupled to the first input/output end 101, and the passive revolution part 1032, to the second input/output end 102; depending on the operation requirements, either in the unidirectional or bidirectional transmission, the flexible coupling device described above may be comprised of a mechanical, dynamoelectric, or other physical structure provided with a mechanism of a specific or controllable flexibility or torque value;

Flexibility or torque value control device 105: related to an optional item provided for controlling the flexible coupling device; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and the control may be elected to (1) control and regulate the flexibility or torque value of the first input/output end to the second input/output end; (2) to control and regulate the second input/output end feeds the transition back to the first input/output end; or (3) to control and regulate both (1) and (2) for the transmission flexibility or torque value of both ends to be the same or different; and A non-contact type damper flywheel 130: comprised of a flywheel with its inherited non-contact type damper effects, or a flywheel incorporated with a damper device of non-contact type damper effects, or a flywheel incorporated with a mechanical damper load; and the non-contact type damper effects include a structure comprised of non-contact type damper effects of inverse torque damper providing eddy effects damper, gas or liquid type flow velocity damper, viscous type damper of magnetic flow or powder, or generator effects, or comprised of other damper effects structure of the prior art.

The non-contact type damper flywheel 130 is directly driven from the second input/output end 102 of the flexible coupling device 103 or through the transmission device 121 comprised of a transmission gear set of the prior art in the direction from the first input/output end 101, the flexible coupling device 103 to drive the non-contact type damper flywheel 130 in the fashion of flexible drive. Wherein, the non-contact type damper flywheel 130 is provided with the function of inertia feedback of transmission in the opposite direction.

Each of all key components including the flexible coupling device 103 and the non-contact type damper flywheel 130 can be made standing-alone or sharing the same structure between two or among multiple components.

The application of the bidirectional coupling device with variable transmission characteristics of the present invention is further comprised of multiple flexible coupling devices allowing flexible interaction in the same or opposite direction between two flexible coupling devices; or comprised of multiple flexible coupling devices and friction type damper flywheel or non-contact type damper flywheel allowing each flexible coupling device execute the input in the same of opposite direction to drive the friction type damper flywheel, non-contact type damper flywheel or other damper load device provided with a specific damper value or a control mechanism to control the damper value. The applications therein are described in the following preferred embodiments.

Figure 33:
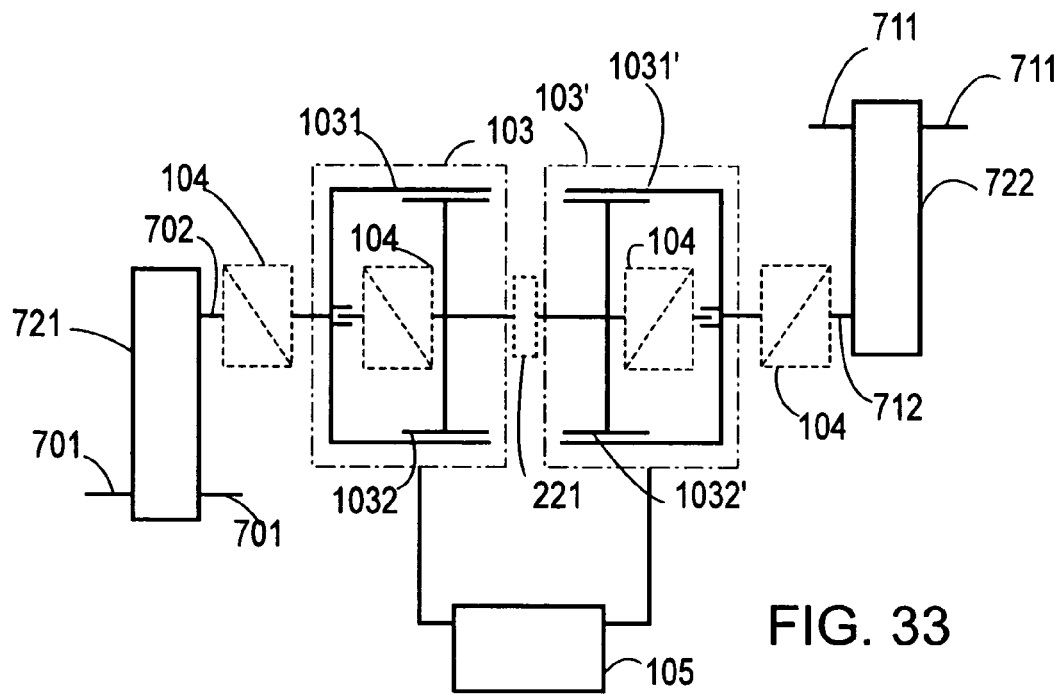
FIG. 33 is a schematic view of another preferred embodiment yet of the present invention showing that a flexible and interacting damper device to operate in the same revolution direction or inversely to input is comprised of two flexible coupling devices.

FIG. 33 is a schematic view of another preferred embodiment yet of the present invention showing that a flexible and interacting damper device to operate in the same revolution direction or inversely to input is comprised of two flexible coupling devices. The preferred embodiment is essentially comprised of:

The passive revolution part 1032 of the first flexible coupling device 103 and a passive revolution part 1032' of a second flexible coupling device 103' are coupled to each other. The active revolution part 1031 of the first flexible coupling device 103 is directly driven by an output end 702 of a transmission device 721, and either or both sides of the transmission device 721 is provided with an input end 701 to drive the active revolution part 1031 of the first flexible coupling device 103 through the output end 702, which is driven by the transmission device 721 comprised of a transmission gear set of the prior art. An active revolution part 1031' of the second flexible coupling device 103' is driven by the output end 712 of another transmission device 722, and either or both sides of the transmission device 722 is provided with an input end 711 to drive the active revolution part 1031' of the second flexible coupling device 103' through the output end 712, which is driven by transmission device 722 comprised of a transmission gear set of the prior art;

Flexibility or torque value control device 105: related to an optional item provided for controlling the flexible coupling devices 103 and 103'; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electro-magnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and Unidirectional transmission device 104: related to one that is comprised of a unidirectional clutch or any other transmission device of the prior art that is capable of executing unidirectional transmission while idling in the opposite direction. Depending on the operation requirements, the unidirectional transmission device may be provided in any or all of the following locations including (1) in series at where between the input end 702 and the active revolution part 1031 of the first flexible coupling device 103, (2) in series at where between the active revolution part 1031 and the passive revolution part 1032 of the first flexible coupling device 103; (3) in series at where between the input end 712 and the active revolution part 1031' of the second flexible coupling device 103', and (4) in series at where between the active revolution part 1031' and the passive revolution part 1032' of the second flexible coupling device 103' or not provided at all.

Figure 34:
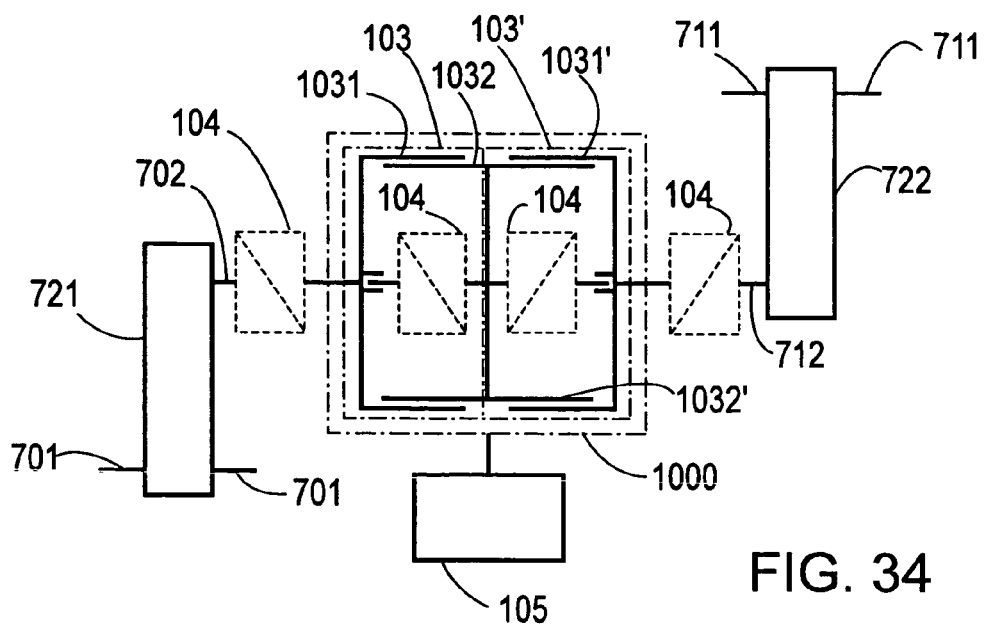
FIG. 34 is a schematic view of the preferred embodiment yet of the present invention illustrated in FIG. 33 showing that a flexible and interacting damper device is comprised of two flexible coupling devices sharing a common structure.

FIG. 34 is a schematic view of the preferred embodiment yet of the present invention illustrated in FIG. 33 showing that a flexible and interacting damper device is comprised of two flexible coupling devices sharing a common structure. The preferred embodiment is essentially comprised of:

A common structure 1000 of the flexible coupling and damper is comprised of the passive revolution part 1032 of the first flexible coupling device 103 and a passive revolution part 1032' of a second flexible coupling device 103' coupled to each other. The active revolution part 1031 of the first flexible coupling device 103 is directly driven by an output end 702 of a transmission device 721, and either or both sides of the transmission device 721 is provided with an input end 701 to drive the active revolution part 1031 of the first flexible coupling device 103 through the output end 702, which is driven by the transmission device 721 comprised of a transmission gear set of the prior art. The active revolution part 1031' of the second flexible coupling device 103' is driven by the output end 712 of another transmission device 722, and either or both sides of the transmission device 722 is provided with an input end 711 to drive the active revolution part 1031' of the second flexible coupling device 103' through the output end 712, which is driven by the transmission device 722 comprised of a transmission gear set of the prior art;

Flexibility or torque value control device 105: related to an optional item provided for controlling the flexible coupling devices 103 and 103'; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electro-magnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and Unidirectional transmission device 104: related to one that is comprised of a unidirectional clutch or any other transmission device of the prior art that is capable of executing unidirectional transmission while idling in the opposite direction. Depending on the operation requirements, the unidirectional transmission device may be provided in any or all of the following locations including (1) in series at where between the input end 702 and the active revolution part 1031 of the first flexible coupling device 103, (2) in series at where between the active revolution part 1031 and the passive revolution part 1032 of the first flexible coupling device 103; (3) in series at where between the input end 712 and the active revolution part 1031' of the second flexible coupling device 103', and (4) in series at where between the active revolution part 1031' and the passive revolution part 1032' of the second flexible coupling device 103' or not provided at all.

Figure 35:
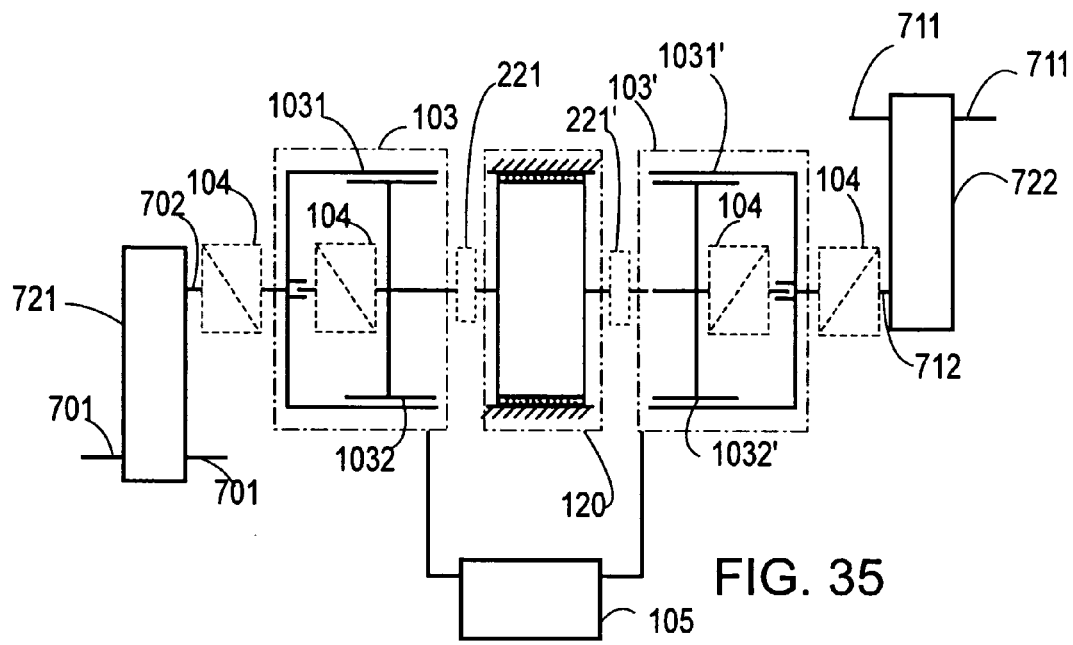
FIG. 35 is a schematic view of another preferred embodiment yet of the present invention showing that a flexible and interacting damper device is comprised of two flexible coupling devices and a damper flywheel of friction type.

FIG. 35 is a schematic view of another preferred embodiment yet of the present invention showing that a flexible and interacting damper device is comprised of two flexible coupling devices and a damper flywheel of friction type. The preferred embodiment is essentially comprised of:

The first flexible coupling device 103, the second flexible coupling device 103', and the common friction type damper flywheel 120 (or other damper device). The friction type damper flywheel (or other damper device) is provided with a specific or controller damper value mechanism and related control mechanism. Both sides of the interacting damper device are directly or by means of transmission devices 221, 221' coupled to the passive resolution part 1032 of the first flexible coupling device 103 and the passive revolution part 1032' of the second flexible coupling device 103' respectively. The passive revolution part 1032 of the first flexible coupling device 103 is coupled to the first active revolution part 1031; and the passive revolution part 1032' of the second flexible coupling device 103' is coupled to the second active revolution part 1031'. The first active revolution part 1031 is driven by the output end 702 of the transmission device 721; and the second active revolution part 1031' is driven by the output end 712 of the transmission device 722. Either or both sides of the transmission device 721 is provided with an input end 701 to drive the first active revolution part 1031 through the output end 702, which is driven by the transmission device 721 comprised of a transmission gear set of the prior art. Either or both sides of the transmission device 722 is provided with an input end 711 to drive the second active revolution part 1031' through the output end 712, which is driven by the transmission device 722 comprised of a transmission gear set of the prior art;

Flexibility or torque value control device 105: related to an optional item provided for controlling the flexible coupling devices 103 and 103'; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electro-magnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and Unidirectional transmission device 104: related to one that is comprised of a unidirectional clutch or any other transmission device of the prior art that is capable of executing unidirectional transmission while idling in the opposite direction. Depending on the operation requirements, the unidirectional transmission device may be provided in any or all of the following locations including (1) in series at where between the input end 702 and the active revolution part 1031 of the first flexible coupling device 103, (2) in series at where between the active revolution part 1031 and the passive revolution part 1032 of the first flexible coupling device 103; (3) in series at where between the input end 712 and the active revolution part 1031' of the second flexible coupling device 103', and (4) in series at where between the active revolution part 1031' and the passive revolution part 1032' of the second flexible coupling device 103' or not provided at all.

Figure 36:
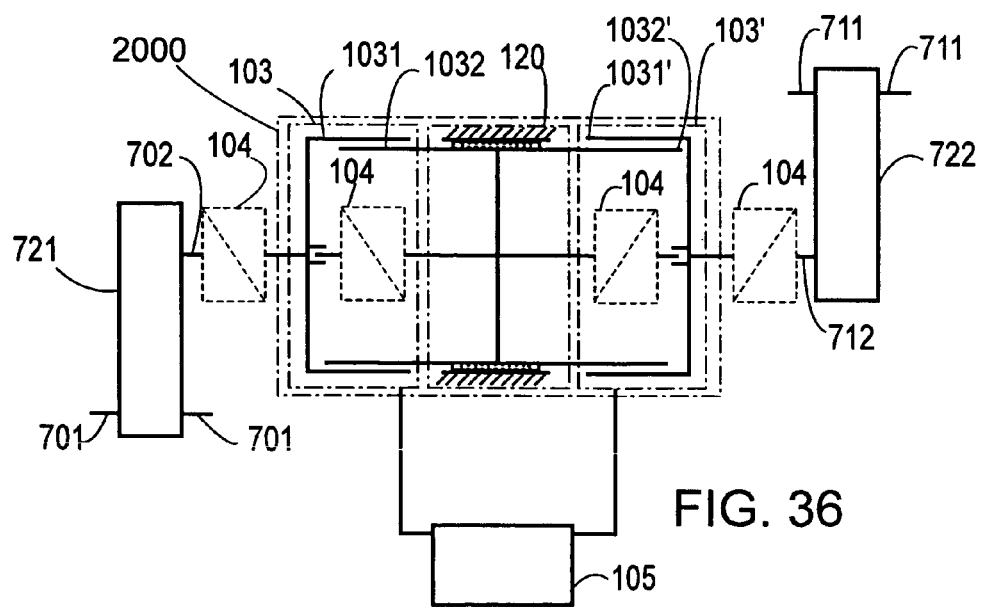
FIG. 36 is a schematic view of another preferred embodiment yet of the present invention showing that two flexible coupling devices and a damper flywheel of friction type of the flexible and interacting damper device share a common structure.

FIG. 36 is a schematic view of another preferred embodiment yet of the present invention showing that two flexible coupling devices and a damper flywheel of friction type of the flexible and interacting damper device share a common structure. The preferred embodiment is essentially comprised of:

A common structure 2000 of the flexible coupling and damper is comprised of the first flexible coupling device 103, the second flexible coupling device 103' and the friction type damper flywheel 120 (or other mechanical or fluid pressure type damper device) coupled to one another. In the common structure 2000 of the flexible coupling and damper, the friction type damper flywheel (or other damper device) is provided with a specific or controllable damper value mechanism and related control mechanism. Both side of the friction type damper flywheel 120 are directly coupled to the passive revolution parts 1032 and 1032' of both flexible devices 103 and 103' respectively. The passive revolution part 1032 of the first flexible coupling device 103 is coupled to the first active revolution part 1031 and the passive revolution part 1032' of the second coupling device 103' is coupled to the active revolution part 1031'. The first active revolution part 1031 is driven by the output end 702 of a transmission device 721, and the second active revolution part 1031' is driven by the output end 712 of the transmission device 722. Either or both sides of the transmission device 721 is provided with an input end 701 to drive the active revolution part 1031 through the output end 702, which is driven by the transmission device 721 comprised of a transmission gear set of the prior art, and either or both sides of the transmission device 722 is provided with an input end 711 to drive the second active revolution part 1031' through the output end 712, which is driven by the transmission device 722 comprised of a transmission gear set of the prior art;

Flexibility or torque value control device 105: related to an optional item provided for controlling the flexible coupling devices 103 and 103'; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electro-magnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and Unidirectional transmission device 104: related to one that is comprised of a unidirectional clutch or any other transmission device of the prior art that is capable of executing unidirectional transmission while idling in the opposite direction. Depending on the operation requirements, the unidirectional transmission device may be provided in any or all of the following locations including (1) in series at where between the input end 702 and the active revolution part 1031 of the first flexible coupling device 103, (2) in series at where between the active revolution part 1031 and the passive revolution part 1032 of the first flexible coupling device 103; (3) in series at where between the input end 712 and the active revolution part 1031' of the second flexible coupling device 103', and (4) in series at where between the active revolution part 1031' and the passive revolution part 1032' of the second flexible coup ling device 103' or not provided at all.

Figure 37:
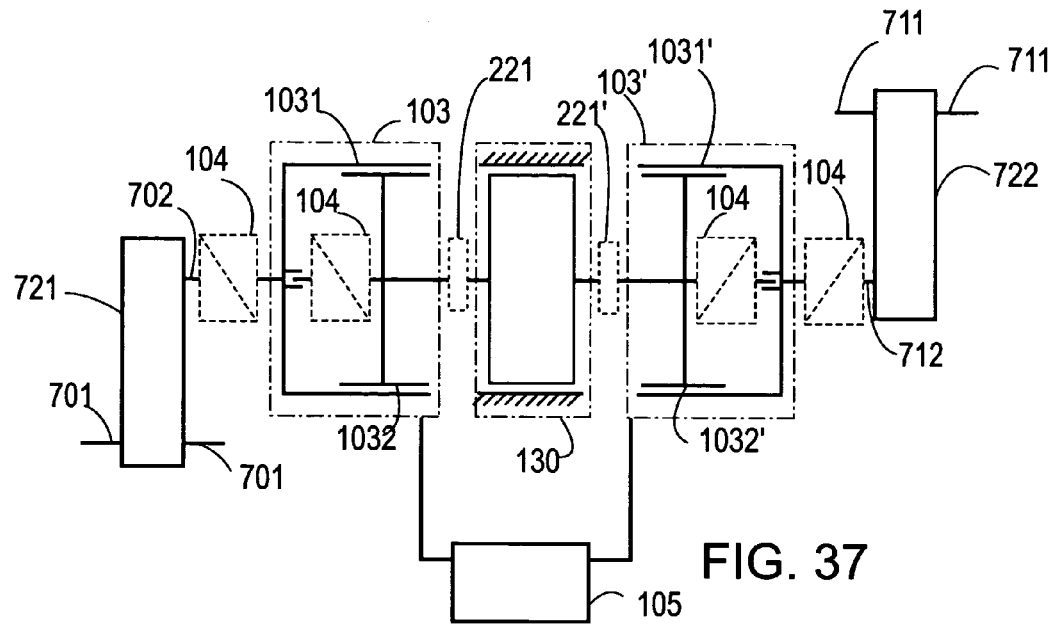
FIG. 37 is a schematic view of another preferred embodiment yet of the present invention showing that that a flexible and interacting damper device is comprised of two flexible coupling devices and a damper flywheel of non-contact type.

FIG. 37 is a schematic view of another preferred embodiment yet of the present invention showing that that a flexible and interacting damper device is comprised of two flexible coupling devices and a damper flywheel of non-contact type. The preferred embodiment is essentially comprised of:

The first flexible coupling device 103, the second flexible coupling device 103, and the common non-contact type damper flywheel 130 (or other non-contact type damper device). The damper value of the non-contact type damper flywheel (or other non-contact type damper device) is provided with a specific or controller damper value mechanism and related control mechanism. Both sides of the interacting damper device are directly or by means of transmission devices 221, 221' coupled to the passive resolution part 1032 of the first flexible coupling device 103 and the passive revolution part 1032' of the second flexible coupling device 103' respectively. The passive revolution part 1032 of the first flexible coupling device 103 is coupled to the first active revolution part 1031; and the passive revolution part 1032' of the second flexible coupling device 103' is coupled to the second active revolution part 1031'. The first active revolution part 1031 is driven by the output end 702 of the transmission device 721; and the second active revolution part 1031' is driven by the output end 712 of the transmission device 722. Either or both sides of the transmission device 721 is provided with an input end 701 to drive the first active revolution part 1031 through the output end 702, which is driven by the transmission device 721 comprised of a transmission gear set of the prior art. Either or both sides of the transmission device 722 is provided with an input end 711 to drive the second active revolution part 1031' through the output end 712, which is driven by the transmission device 722 comprised of a transmission gear set of the prior art;

Flexibility or torque value control device 105: related to an optional item provided for controlling the flexible coupling devices 103 and 103'; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electro-magnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and Unidirectional transmission device 104: related to one that is comprised of a unidirectional clutch or any other transmission device of the prior art that is capable of executing unidirectional transmission while idling in the opposite direction. Depending on the operation requirements, the unidirectional transmission device may be provided in any or all of the following locations including (1) in series at where between the input end 702 and the active revolution part 1031 of the first flexible coupling device 103, (2) in series at where between the active revolution part 1031 and the passive revolution part 1032 of the first flexible coupling device 103; (3) in series at where between the input end 712 and the active revolution part 1031' of the second flexible coupling device 103', and (4) in series at where between the active revolution part 1031' and the passive revolution part 1032' of the second flexible coupling device 103' or not provided at all.

Figure 38:
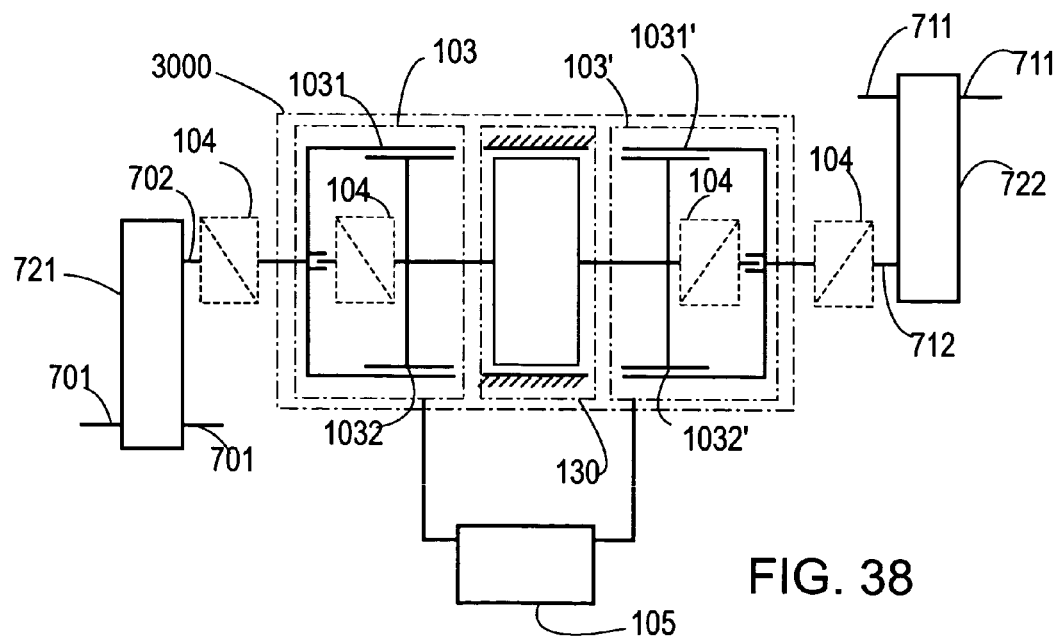
FIG. 38 is a schematic view of another preferred embodiment yet of the present invention showing that two flexible coupling devices and a damper flywheel of non-contact type of the flexible and interacting damper device share a common structure.

FIG. 38 is a schematic view of another preferred embodiment yet of the present invention showing that two flexible coupling devices and a damper flywheel of non-contact type of the flexible and interacting damper device share a common structure. The preferred embodiment is essentially comprised of:

A common structure 3000 of the flexible coupling and damper is comprised of the first flexible coupling device 103, the second flexible coupling device 103' and the non-contact type damper flywheel 130 (or other non-contact type damper device) coupled to one another. In the common structure 3000 of the flexible coupling and damper, the non-contact type damper flywheel (or other non-contact type damper device) is provided with a specific or controllable damper value mechanism and related control mechanism. Both side of the non-contact type damper flywheel 130 are directly coupled to the passive revolution parts 1032 and 1032' of both flexible devices 103 and 103' respectively. The passive revolution part 1032 of the first flexible coupling device 103 is coupled to the first active revolution part 1031 and the passive revolution part 1032' of the second coupling device 103' is coupled to the active revolution part 1031'. The first active revolution part 1031 is driven by the output end 702 of a transmission device 721, and the second active revolution part 1031' is driven by the output end 712 of the transmission device 722. Either or both sides of the transmission device 721 is provided with an input end 701 to drive the active revolution part 1031 through the output end 702, which is driven by the transmission device 721 comprised of a transmission gear set of the prior art, and either or both sides of the transmission device 722 is provided with an input end 711 to drive the active revolution part 1031' through the output end 712, which is driven by the transmission device 722 comprised of a transmission gear set of the prior art;

Flexibility or torque value control device 105: related to an optional item provided for controlling the flexible coupling devices 103 and 103'; depending on the structure and nature of the flexible coupling device adapted to, a physical structure of a mechanical control device, solid state electronic control device or dynamo-electric control device, electro-magnetic control device or fluid control device may be selected for the flexibility or torque value control device so to control mechanical, electromagnetic or other type of physical structure of a mechanical slide friction coupler, viscous fluid slide friction coupler, eddy coupler, magnetic fluid or magnetic powder coupler, gas or liquid driven fluid coupler, dual generation effect coupler, or any other flexible coupling device comprised of the coupler with the similar function of the prior art; the flexible coupling device is provided with a mechanism of specific or controllable flexibility or torque value within a range from zero coupling (coupling being disengaged) up to the maximal flexibility or torque value (totally closed), or within any part of that range; and Unidirectional transmission device 104: related to one that is comprised of a unidirectional clutch or any other transmission device of the prior art that is capable of executing unidirectional transmission while idling in the opposite direction. Depending on the operation requirements, the unidirectional transmission device may be provided in any or all of the following locations including (1) in series at where between the input end 702 and the active revolution part 1031 of the first flexible coupling device 103, (2) in series at where between the active revolution part 1031 and the passive revolution part 1032 of the first flexible coupling device 103; (3) in series at where between the input end 712 and the active revolution part 1031' of the second flexible coupling device 103', and (4) in series at where between the active revolution part 1031' and the passive revolution part 1032' of the second flexible coupling device 103' or not provided at all.

As disclosed above, the bidirectional coupling device with variable transmission characteristics of the present invention is capable of executing the flexible transmission with specific or controllable flexibility or torque value and rigid transmission separately in both directions of mutual transmission; or providing the bi-state coupling functions with specific or controllable flexibility or torque value in both directions of mutual transmission to be provided (1) at the output put of the revolution power source, (2) at the load input under instable impacts, (3) at where between the revolution power source and an inertia flywheel or a damper flywheel, (4) at where between the load and the inertia flywheel or the damper flywheel, or (5) at any other machine engaging in the transmission of revolution kinetics.

The bi-directional coupling device with variable transmission characteristics of the present invention provides a very comprehensive range of application. For example, the device may be applied in any device driven by engine power or electric power, various air, land, surface, and underwater crafts; in various types of constructional machine, industrial machine, punching machine, pressing machine, shearing machine, forging machine or tooling machine; or in any device driven by air or flow velocity, namely, wind turbine or hydraulic generator, wind actuated exhaust fan, wind actuated pump, output device of tidal energies revolution power, or any other output device of revolution power converted from flowing currents; or in manually driving devices including bicycle, sports equipment, revolution tool, generator, gears, or other manually driving devices. Therefore, this application for a patent is duly filed accordingly.

The invention claimed is:

1. A bidirectional coupling device with variable transmission characteristics, wherein, the bidirectional coupling device includes a coupler of bidirectional revolution transmission comprised of a dual-acting generation effect coupler and a unidirectional transmission device wherein:

a first input/output end (501) is coupled to one side of the unidirectional transmission device (504) and to an active revolution part (5031) of a generation effect coupler;

a second input/output end (502) is coupled to a revolving load or a flywheel and is coupled to a passive revolution part (5032) of the generation effect coupler, and then to the other side of the unidirectional transmission device (504);

the dual-acting generation effect coupler (503) includes a dynamoelectric field structure comprised of permanent magnet or excitement windings excited by electric current to serve as the active revolution part (5031) of the dual-acting generation effect coupler (503), and a dynamoelectric armature engaging in relative revolution to serve as the passive revolution part (5032) of the dual-acting generation effect coupler (503), wherein:

when the dual-acting generation effect coupler (503) is driven in revolution, the generated energy is transmitted to an electrical load (506) and is controlled by a control circuit (505) such that when the first input/output end (501) revolves to drive the active revolution part (5031) of the dual-acting generation effect coupler (503) in rotational speed difference with the passive revolution part (5032), the generated electrical energy transmitted to the electrical load (506) is controlled by the control circuit (505) to generate relative torque between the active revolution part (5031) and the passive revolution part (5032), thus to drive the passive revolution part (5032) and further to drive the second input/output end (502);

a first end of the unidirectional transmission device (504) is coupled to the first input/output end (501) of the dual-acting generation effect coupler (503) and a second end of the unidirectional transmission device is coupled to the passive revolution part (5032) of the dual-acting generation effect coupler (503) so that rigid transmission is executed in a first direction of coupling transmission while flexible transmission is executed in a second direction of coupling transmission; and the control circuit (505) is constructed to control at least one of an outputted voltage, amperage, generation output power, polarity (in case of DC), or phase and frequency (in case of AC) that are transmitted to electrical load (506) from the dual-acting generation effect coupler (503);

wherein when the power generated by the dual-acting generation effect coupler supplies the power in parallel to a city power system, or supplies the power to a resistant load or other electric energy driven load, or to an energy storage device, which becomes the load for the dual-acting generation effect coupler (503) to generate and supply power to the load; accordingly, a unidirectional or bidirectional flexible coupling function is achieved between the active revolution part (5031) and the passive revolution part (5032), and the outputted power is controlled by the control circuit (505).

2. The bidirectional coupling device with variable transmission characteristics as claimed in claim 1, wherein, by means of a transmission direction set by the unidirectional transmission device (504), rotary kinetic energy is delivered in flexible transmission from the first input/output end (501) by means of the dual-acting generation effect coupler to the second input/output end (502); and rotary kinetic energy is fed in rigid transmission without relative transmission revolution difference from the second input/output end (502) back to the first input/output end (501) through the unidirectional transmission device (504).

3. The bidirectional coupling device with variable transmission characteristics as claimed in claim 1, wherein, by means of a transmission direction set by the unidirectional transmission device (504), rotary kinetic energy is delivered in flexible transmission from the second input/output end (502) by means of the dual-acting generation effect coupler to the first input/output end (501); and rotary kinetic energy is fed in rigid transmission without relative transmission revolution difference from the first input/output end (501) back to the second input/output end (502) through the unidirectional transmission device (504).

* * * * *